(12) United States Patent
Liu et al.

(10) Patent No.: US 12,704,674 B2
(45) Date of Patent: Aug. 11, 2026

(54) INTEGRATED HIGH-EXTINCTION RATIO UNBALANCED MACH ZEHNDER INTERFEROMETERS AND INTEGRATED MACH ZEHNDER INTERFEROMETERS INCORPORATING COIL RESONATORS

(71) Applicant: The Regents of the University of California, Oakland, CA (US)

(72) Inventors: Kaikai Liu, Santa Barbara, CA (US); Jiawei Wang, Malden, MA (US); Andrei Isichenko, Goleta, CA (US); Nitesh Chauhan, Sunnyvale, CA (US); Daniel J. Blumenthal, Santa Barbara, CA (US)

(73) Assignee: The Regents of the University of California, Oakland, CA (US)

( * ) Notice: Subject to any disclaimer, the term of this patent is extended or adjusted under 35 U.S.C. 154(b) by 315 days.

(21) Appl. No.: 18/393,142

(22) Filed: Dec. 21, 2023

(65) Prior Publication Data

US 2024/0344891 A1 Oct. 17, 2024

Related U.S. Application Data

(60) Provisional application No. 63/476,586, filed on Dec. 21, 2022.

(51) Int. Cl.
*G02B 6/12* (2006.01)
*G01J 9/02* (2006.01)

(52) U.S. Cl.
CPC .................. *G02B 6/12* (2013.01); *G01J 9/02* (2013.01); *G01J 2009/023* (2013.01); *G01J 2009/0288* (2013.01); *G02F 2203/15* (2013.01)

(58) Field of Classification Search
CPC .......... G02B 6/12; G02B 6/122; G02B 6/125; G02B 6/2861
See application file for complete search history.

(56) References Cited

U.S. PATENT DOCUMENTS 5,359,412 A * 10/1994 Schulz .................. H04B 10/67 356/478
5,499,308 A * 3/1996 Arai .................. G02B 6/29352 385/27

(Continued)

FOREIGN PATENT DOCUMENTS

CN 106249354 A * 12/2016
CN 110515290 A 11/2019

(Continued)

OTHER PUBLICATIONS

D. Liu et al. Large-capacity and low-loss integrated optical buffer. Optics Express, vol. 27 No. 8, pp. 11585-11593, Apr. 15, 2019 (https://doi.org/10.1364/OE.27.011585) (Year: 2019).*

(Continued)

*Primary Examiner* — Michael Stahl
(74) *Attorney, Agent, or Firm* — KPPB LLP

(57) ABSTRACT

A device may include a first waveguide with an optical input at a first port. A device may include a second waveguide. A device may include a first coupler that optically couples the first waveguide to the second waveguide at a first position. A device may include a waveguide delay arm. A device may include a second coupler that optically couples the first waveguide to the second waveguide at a second position, the second position different from the first position.

18 Claims, 9 Drawing Sheets

(56) References Cited

U.S. PATENT DOCUMENTS

| | | | | | |
|---|---|---|---|---|---|
| 5,701,372 | A * | 12/1997 | Magel | G02B 6/2861 385/32 |
| 10,663,662 | B1 * | 5/2020 | Gehl | G02B 6/122 |
| 2003/0012538 | A1 | 1/2003 | Johnson et al. | |
| 2004/0067002 | A1 * | 4/2004 | Berg | G01V 11/00 385/12 |
| 2008/0044184 | A1 * | 2/2008 | Popovic | G02B 6/12007 398/82 |
| 2011/0103415 | A1 * | 5/2011 | Rasras | G02B 6/4215 250/214 R |
| 2011/0122906 | A1 * | 5/2011 | Seeley | H01S 5/143 356/477 |
| 2013/0215919 | A1 * | 8/2013 | Aflatouni | H01S 5/12 372/38.08 |
| 2019/0056632 | A1 * | 2/2019 | Dutt | G02F 1/365 |
| 2019/0341739 | A1 * | 11/2019 | Loh | H01S 3/2383 |
| 2021/0364703 | A1 * | 11/2021 | Fondeur | G02B 6/2935 |
| 2022/0050356 | A1 | 2/2022 | Kippenberg et al. | |
| 2022/0278497 | A1 | 9/2022 | Ahn et al. | |
| 2024/0184041 | A1 | 6/2024 | Blumenthal et al. | |
| 2024/0184180 | A1 * | 6/2024 | Yuan | G02F 1/212 |
| 2024/0203616 | A1 | 6/2024 | Blumenthal et al. | |
| 2024/0210625 | A1 | 6/2024 | Bose et al. | |
| 2024/0213735 | A1 | 6/2024 | Isichenko et al. | |
| 2024/0255751 | A1 | 8/2024 | Blumenthal et al. | |
| 2024/0322523 | A1 * | 9/2024 | Blumenthal | H01S 5/0687 |
| 2024/0329488 | A1 * | 10/2024 | Idjadi | G02F 1/225 |
| 2024/0337791 | A1 | 10/2024 | Blumenthal et al. | |

FOREIGN PATENT DOCUMENTS

| | | | |
|---|---|---|---|
| CN | 110596813 | A * | 12/2019 |
| JP | 8-5834 | A * | 1/1996 |
| JP | 2014-182259 | A * | 9/2014 |
| WO | WO 01/23955 | A2 * | 4/2001 |
| WO | WO 2007/074485 | A1 * | 7/2007 |
| WO | 2022188990 | A1 | 9/2022 |
| WO | WO 2023/272691 | A1 * | 1/2023 |

OTHER PUBLICATIONS

R. Moreira et al. Integrated ultra-low-loss 4-bit tunable delay for broadband phased array antenna applications. IEEE Photonics Technology Letters, vol. 25 No. 12, pp. 1165-1168, Jun. 15, 2013 (https://doi.org/10.1109/LPT.2013.2261807) (Year: 2013).*

M. Belt et al. Ultra-low-loss Ta2O5-core/SiO2-clad planar waveguides on Si substrates. Optica, vol. 4 No. 5, pp. 532-536, May 2017 (https://doi.org/10.1364/OPTICA.4.000532) (Year: 2017).*

H. Lee et al. Ultra-low-loss optical delay line on a silicon chip. Nature Communications, vol. 3, pp. 1-7, May 2012 (https://doi.org/10.1038/ncomms1876) (Year: 2012).*

M. Idjadi et al. Nanophotonic phase noise filter in silicon. Nature Photonics, vol. 14, pp. 234-239, Apr. 2020 (https://doi.org/10.1038/s41566-020-0605-1) (Year: 2020).*

X. Xie et al. Ring-assisted frequency discriminator with improved linearity. IEEE Photonics Technology Letters, vol. 14 No. 8, pp. 1136-1138, Aug. 2002 (https://doi.org/10.1109/LPT.2002.1021994) (Year: 2002).*

D. Xu et al. Archimedean spiral cavity ring resonators in silicon as ultra-compact optical comb filters. Optics Express, vol. 18 No. 3, pp. 1937-1945, Feb. 2010 (https://doi.org/10.1364/OE.18.001937) (Year: 2010).*

DuPont™ Kapton®, Summary of Properties, Mar. 2012, 26 pgs.

"Cisco Global Cloud Index: Forecast and Methodology, 2015-2020", Cisco, White paper, 2016, 29 pgs.

"Cisco Introduces Foundation for Next-Generation Internet: The Cisco CRS-3 Carrier Routing System", Cisco, Mar. 9, 2010, Retrieved from internet: "<https://newsroom.cisco.com/c/r/newsroom/en/us/a/y2010/m03/cisco-introduces-foundation-for-next-generation-internet-the-cisco-crs-3-carrier-routing-system.html>", Retrieved on Sep. 2, 2025, 7 pgs.

"Cisco Visual Networking Index: Forecast and Methodology, 2016-2021", Cisco, White paper, Jun. 6, 2017, 17 pgs.

"Cisco Visual Networking Index: Forecast and Trends, 2017-2022", Cisco, White paper, 2019, 38 pgs.

"Crystal Quartz SiO2", Crystran, Retrieved from internet: <https://www.crystran.com/optical-materials/crystal-quartz-sio2>, Retrieved on Sep. 8, 2025, 2 pgs.

"Intel Demonstrates Industry-First Co-Packaged Optics Ethernet Switch", Intel Newsroom, Published on Mar. 5, 2020, Retrieved from internet: "<https://download.intel.com/newsroom/archive/2025/en-us-2020-03-05-intel-demonstrates-industryfirst-copackaged-optics-ethernet-switch.pdf>", Retrieved on Sep. 2, 2025, 6 pgs.

"PECVD Recipes—UCSB Nanofab Wiki", UCSB Nanofabrication Facility, Retrieved from: https://wiki.nanofab.ucsb.edu/wiki/PECVD_Recipes#ICP-PECVD_.28Unaxis_VLR.29, Retrieved on Jan. 13, 2025, 3 pgs.

Aaltonen et al., "Ruthenium Thin Films Grown by Atomic Layer Deposition", Chemical Vapor Deposition, vol. 9, No. 1, Jan. 2003, pp. 45-49, doi: 10.1002/cvde.200290007.

Abbott et al., "Observation of Gravitational Waves from a Binary Black Hole Merger", Physical Review Letters, vol. 116, Article 061102, Feb. 12, 2016, 16 pgs., doi: 10.1103/PhysRevLett.116.061102.

Abramovici et al., "LIGO: The Laser Interferometer Gravitational-Wave Observatory", Science, vol. 256, No. 5055, Apr. 17, 1992, pp. 325-333, doi: 10.1126/science.256.5055.325.

Ahmed et al., "Tunable hybrid silicon nitride and thin-film lithium niobate electro-optic microresonator", Optics Letters, vol. 44, No. 3, Feb. 1, 2019, pp. 618-621, doi: 10.1364/OL.44.000618.

Alexander et al., "Nanophotonic Pockels modulators on a silicon nitride platform", Nature Communications, vol. 9, Article 3444, Aug. 27, 2018, 6 pgs., doi: 10.1038/s41467-018-05846-6.

Allan, "Statistics of Atomic Frequency Standards", Proceedings of the IEEE, vol. 54, No. 2, Feb. 1966, pp. 221-230, doi: 10.1109/PROC.1966.4634.

Allan, "Time and Frequency (Time-Domain) Characterization, Estimation, and Prediction of Precision Clocks and Oscillators", IEEE Transactions on Ultrasonics, Ferroelectrics, and Frequency Control, vol. 34, No. 6, Nov. 1987, pp. 647-654, doi: 10.1109/T-UFFC.1987.26997.

Alnis et al., "Thermal-noise-limited crystalline whispering-gallery-mode resonator for laser stabilization", Physical Review A, vol. 84, No. 011804(R), Jul. 15, 2011, pp. 011804-1-011804-4, doi: 10.1103/PhysRevA.84.011804.

Andrae, "Total Consumer Power Consumption Forecast", Nordic Digital Business Summit, Oct. 5, 2017, 27 pgs.

Arbabi et al., "Measurements of the refractive indices and thermo-optic coefficients of Si3N4 and SiOx using microring resonances", Optics Letters, vol. 38, No. 19, Oct. 1, 2013, pp. 3878-3881, doi: 10.1364/OL.38.003878.

Audoin et al., "A Limit to the Frequency Stability of Passive Frequency Standards Due to an Intermodulation Effect", IEEE Transactions on Instrumentation and Measurement, vol. 40, No. 2, Apr. 1991, pp. 121-125, doi: 10.1109/tim.1990.1032896.

Ayazi et al., "Linearity of silicon ring modulators for analog optical links", Optics Express, vol. 20, No. 12, May 25, 2012, pp. 13115-13122, doi: 10.1364/OE.20.013115.

Balakier et al., "Integrated Semiconductor Laser Optical Phase Lock Loops", IEEE Journal of Selected Topics in Quantum Electronics, vol. 24, No. 1, Jan./Feb. 2018, 12 pgs., doi: 10.1109/JSTQE.2017.2711581.

Bandres et al., "Topological insulator laser: Experiments", Science, vol. 359, No. 6381, Mar. 16, 2018, 5 pgs., doi: 10.1126/science.aar4005.

Barron et al., "Thermal expansion, Gruneisen functions and static lattice properties of quartz", Journal of Physics C: Solid State Physics, vol. 15, No. 20, 1982, pp. 4311-4326, doi: 10.1088/0022-3719/15/20/016.

Baumgartel et al., "Frequency stability of a dual-mode whispering gallery mode optical reference cavity", Optics Express, vol. 20, No. 28, Dec. 31, 2012, pp. 29798-29806, doi: 10.1364/OE.20.029798.

(56) References Cited

OTHER PUBLICATIONS

Bauters et al., "Ultra-low-loss high-aspect-ratio Si3N4 waveguides", Optics Express. vol. 19, No. 4, Feb. 14, 2011, pp. 3163-3174, doi: 10.1364/OE.19.003163.
Bayer et al., "Optical Modes in Photonic Molecules", Physical Review Letters, vol. 81, No. 12, Sep. 21, 1998, pp. 2582-2585, doi: 10.1103/physrevlett.81.2582.
Behunin et al., "Fundamental noise dynamics in cascaded-order Brillouin lasers", Physical Review A, vol. 98, No. 023832, Aug. 17, 2018, pp. 023832-1-023832-17, doi: 10.1103/PhysRevA.98.023832.
Beloy et al., "Frequency ratio measurements at 18-digit accuracy using an optical clock network", Nature, vol. 591, Mar. 25, 2021, pp. 564-569, doi: 10.1038/s41586-021-03253-4.
Beppu et al., "2048 QAM (66 Gbit/s) single-carrier coherent optical transmission over 150 km with a potential SE of 15.3 bit/s/Hz", Optics Express, vol. 23, No. 4, Feb. 23, 2015, pp. 4960-4969, doi: 10.1364/OFC.2014.W1A.6.
Bitou, "High-accuracy displacement metrology and control using a dual Fabry-Perot cavity with an optical frequency comb generator", Precision Engineering, vol. 33, No. 2, Apr. 2009, pp. 187-193, doi: 10.1016/j.precisioneng.2008.05.004.
Black, "An introduction to Pound-Drever-Hall laser frequency stabilization", American Journal of Physics, vol. 69, No. 1, Jan. 2001, pp. 79-87, doi: 10.1119/1.1286663.
Bloom et al., "An optical lattice clock with accuracy and stability at the 10-18 level", Nature, vol. 506, Jan. 22, 2014, pp. 71-75, doi: 10.1038/nature12941.
Blumenthal, "Photonic integration for UV to IR applications", APL Photonics, vol. 5, No. 2, Feb. 2020, pp. 020903-1-020903-12, doi: 10.1063/1.5131683.
Blumenthal, "Ultra-Stable Integrated Lasers and Low-Cost, Low-Energy Coherent Data Center Interconnect", Advanced Photonics Congress, paper NeM4D.1, 2019, 2 pgs., doi: 10.1364/NETWORKS.2019.NeM4D.1.
Blumenthal et al., "Frequency Stabilized Lasers for Coherent Fiber Interconnects in the Datacenter (Invited Talk)", IEEE Optical Interconnects Conference (OI), 2019, pp. 1-2, doi: 10.1109/OIC.2019.8714367.
Blumenthal et al., "Frequency-Stabilized Links for Coherent WDM Fiber Interconnects in the Datacenter", Journal of Lightwave Technology, vol. 38, No. 13, Jul. 1, 2020, pp. 3376-3386, doi: 10.1109/JLT.2020.2985275.
Blumenthal et al., "Integrated Photonics for Low-Power Packet Networking", IEEE Journal of Selected Topics in Quantum Electronics, vol. 17, No. 2, Mar./Apr. 2011, pp. 458-471, doi: 10.1109/JSTQE.2010.2077673.
Blumenthal et al., "Silicon Nitride in Silicon Photonics", Proceedings of the IEEE, vol. 106, No. 12, Dec. 2018, pp. 2209-2231, doi: 10.1109/JPROC.2018.2861576.
Bogaerts et al., "Silicon microring resonators", Laser & Photonics Reviews, vol. 6, No. 1, Jan. 2012, pp. 47-73, doi: 10.1002/lpor.201100017.
Bogdanov et al., "Material platforms for integrated quantum photonics", Optical Materials Express, vol. 7, No. 1, Jan. 1, 2017, pp. 111-132, doi: 10.1364/OME.7.000111.
Bohn et al., "Cold molecules: Progress in quantum engineering of chemistry and quantum matter", Science, vol. 357, No. 6355, Sep. 8, 2017, pp. 1002-1010, doi: 10.1126/science.aam6299.
Bongs et al., "Taking atom interferometric quantum sensors from the laboratory to real-world applications", Nature Reviews Physics, vol. 1, Dec. 2019, pp. 731-739, doi: 10.1038/s42254-019-0117-4.
Boriskina, "Photonic Molecules and Spectral Engineering", Chapter 16, Photonic Microresonator Research and Applications, vol. 156, 2010, pp. 393-421, doi: 10.1007/978-1-4419-1744-7_16.
Bose et al., "250C Process for < 2dB/m Ultra-Low Loss Silicon Nitride Integrated Photonic Waveguides", Conference on Lasers and Electro-Optics, 2022, 2 pgs., doi: 10.1364/CLEO_SI.2022.SF3O.1.
Bose et al., "Anneal-free ultra-low loss silicon nitride integrated photonics", Light: Science & Applications, vol. 13, Article 156, Jul. 8, 2024, 13 pgs., doi: 10.1038/s41377-024-01503-4.
Boshier et al., "External-cavity frequency-stabilization of visible and infrared semiconductor lasers for high resolution spectroscopy", Optics Communications, vol. 85, No. 4, Sep. 15, 1991, pp. 355-359, doi: 10.1016/0030-4018(91)90490-5.
Boust et al., "Microcomb Source Based on InP DFB / Si3N4 Microring Butt-Coupling", Journal of Lightwave Technology, vol. 38, No. 19, Oct. 1, 2020, pp. 5517-5525, doi: 10.1109/jlt.2020.3002272.
Braginsky et al., "Thermodynamical fluctuations and photo-thermal shot noise in gravitational wave antennae", Physics Letters A, vol. 264, No. 1, Dec. 13, 1999, pp. 1-10, doi: 10.1016/S0375-9601(99)00785-9.
Briles et al., "Generating Octave-Bandwidth Soliton Frequency Combs with Compact Low-Power Semiconductor Lasers", Physical Review Applied, vol. 14, Article 014006, 2020, pp. 014006-1-014006-10, doi: 10.1103/PhysRevApplied.14.014006.
Brodnik et al., "Optically synchronized fibre links using spectrally pure chip-scale lasers", Nature Photonics, vol. 15, Aug. 2021, pp. 588-593, doi: 10.1038/s41566-021-00831-w.
Burns et al., "Observation of noncritically phase-matched second-harmonic generation in an optical waveguide", Applied Physics Letters, vol. 24, No. 5, Mar. 1, 1974, pp. 222-224, doi: 10.1063/1.1655160.
Calonico et al., "High-accuracy coherent optical frequency transfer over a doubled 642-km fiber link", Applied Physics B, vol. 117, Sep. 4, 2014, pp. 979-986, doi: 10.1007/s00340-014-5917-8.
Cetinorgu et al., "Mechanical and thermoelastic characteristics of optical thin films deposited by dual ion beam sputtering", Applied Optics, vol. 48, No. 23, Aug. 10, 2009, pp. 4536-4544, doi: 10.1364/AO.48.004536.
Chang et al., "Parity-time symmetry and variable optical isolation in active-passive-coupled microresonators", Nature Photonics, vol. 8, Jun. 22, 2014, pp. 524-529, doi: 10.1038/nphoton.2014.133.
Chauhan et al., "Photonic Integrated Si3N4 Ultra-Large-Area Grating Waveguide MOT Interface for 3D Atomic Clock Laser Cooling", Conference on Lasers and Electro-Optics, 2019, 2 pgs., doi: 10.1364/CLEO_SI.2019.STu4O.3.
Chauhan et al., "Ultra-Low Loss 698 nm and 450 nm Silicon Nitride Visible Wavelength Waveguides for Strontium Atomic Clock Applications", Conference on Lasers and Electro-Optics, 2020, 2 pgs., doi: 10.1364/CLEO_SI.2020.STh1J.2.
Chauhan et al., "Ultra-low loss visible light waveguides for integrated atomic, molecular, and quantum photonics", Optics Express, vol. 30, No. 5, Feb. 28, 2022, pp. 6960-6969, doi: 10.1364/OE.448938.
Chauhan et al., "Visible light photonic integrated Brillouin laser", Nature Communications, vol. 12, Article 4685, Aug. 3, 2021, 8 pgs., doi: 10.1038/s41467-021-24926-8.
Chen et al., "Highly linear ring modulator from hybrid silicon and lithium niobate", Optics Express, vol. 23, No. 10, May 18, 2015, pp. 13255-13264, doi: 10.1364/OE.23.013255.
Chen et al., "Planar-integrated magneto-optical trap", arXiv:2107.07367v1 [physics.atom-ph], Jul. 15, 2021, 5 pgs.
Chiles et al., "Deuterated silicon nitride photonic devices for broadband optical frequency comb generation", Optics Letters, vol. 43, No. 7, Apr. 1, 2018, pp. 1527-1530, doi: 10.1364/OL.43.001527.
Chrostowski et al., "Silicon Photonics Design: From Devices to Systems", Cambridge University Press, Mar. 2015, 439 pgs., doi: 10.1017/cbo9781316084168.
Clivati et al., "A Coherent Fiber Link for Very Long Baseline Interferometry", IEEE Transactions on Ultrasonics Ferroelectrics and Frequency Control, vol. 62, No. 11, Nov. 2015, pp. 1907-1912, doi: 10.1109/TUFFC.2015.007221.
Cole et al., "Higher-Order Modulation for Client Optics", IEEE Communications Magazine, vol. 51, No. 3, Mar. 2013, pp. 50-57, doi: 10.1109/MCOM.2013.6476865.
Corato-Zanarella et al., "Widely tunable and narrow-linewidth chip-scale lasers from near-ultraviolet to near-infrared wavelengths", Nature Photonics, vol. 17, 2023, pp. 157-164, doi: 10.1038/s41566-022-01120-w.

(56) References Cited

OTHER PUBLICATIONS

Corbett et al., "Spanner: Google's Globally-Distributed Database", USENIX Association, 10th USENIX Symposium on Operating Systems Design and Implementation (OSDI '12), 2012, pp. 251-264.
Crasovan et al., "Optical Dyakonov surface waves at magnetic interfaces", Optics Letters, vol. 30, No. 22, Nov. 15, 2005, pp. 3075-3077, doi: 10.1364/OL.30.003075.
Crivelli et al., "Architecture of a Single-Chip 50 GB/s DP-QPSK/BPSK Transceiver With Electronic Dispersion Compensation for Coherent Optical Channels", IEEE Transactions on Circuits and Systems—I: Regular Papers, vol. 61, No. 4, Apr. 2014, pp. 1012-1025, doi: 10.1109/TCSI.2013.2283673.
Cygan et al., "Cavity mode-width spectroscopy with widely tunable ultra narrow laser", Optics Express, vol. 21, No. 24, Dec. 2, 2013, pp. 29744-29754, doi: 10.1364/OE.21.029744.
Dallyn et al., "Thermal and driven noise in Brillouin lasers", Physical Review A, vol. 105, Article 043506, Apr. 11, 2022, 14 pgs., doi: 10.1103/PhysRevA.105.043506.
Davila-Rodriguez et al., "Compact, thermal-noise-limited reference cavity for ultra-low-noise microwave generation", Optics Letters, vol. 42, No. 7, Apr. 1, 2017, pp. 1277-1280, doi: 10.1364/OL.42.001277.
De Heyn et al., "Fabrication-Tolerant Four-Channel Wavelength-Division-Multiplexing Filter Based on Collectively Tuned Si Microrings", Journal of Lightwave Technology, vol. 31, No. 16, Aug. 15, 2013, pp. 2785-2792, doi: 10.1109/JLT.2013.2273391.
Debut et al., "Linewidth narrowing in Brillouin lasers: Theoretical analysis", Physical Review A, vol. 62, Article 023803, Jul. 14, 2000, pp. 023803-1-023803-4, doi: 10.1103/PhysRevA.62.023803.
Degen et al., "Quantum sensing", Reviews of Modern Physics, vol. 89, No. 3, Article 035002, Jul.-Sep. 2017, pp. 035002-1-035002-39, doi: 10.1103/RevModPhys.89.035002.
Del'Haye et al., "Laser-machined ultra-high-Q microrod resonators for nonlinear optics", Applied Physics Letter, vol. 102, No. 22, Article 221119, Jun. 7, 2013, pp. 221119-1-221119-4, doi: 10.1063/1.4809781.
Del'Haye et al., "Optical frequency comb generation from a monolithic microresonator", Nature, vol. 450, Dec. 20, 2007, pp. 1214-1217, doi: 10.1038/nature06401.
Derr et al., "Coherent Optical QPSK Intradyne System: Concept and Digital Receiver Realization", Journal of Lightwave Technology, vol. 10, No. 9, Sep. 1992, pp. 1290-1296, doi: 10.1109/50.156881.
Di Domenico et al., "Simple approach to the relation between laser frequency noise and laser line shape", Applied Optics, vol. 49, No. 25, Sep. 1, 2010, pp. 4801-4807, doi: 10.1364/AO.49.004801.
Dick, "Local Oscillator Induced Instabilities in Trapped Ion Frequency Standards", Proceedings of the 19th Annual Precise Time and Time Interval Systems and Applications Meeting, Dec. 1987, pp. 133-147.
Dierikx et al., "White Rabbit Precision Time Protocol on Long-Distance Fiber Links", IEEE Transactions on Ultrasonics, Ferroelectrics, and Frequency Control, vol. 63, No. 7, Jul. 2016, pp. 945-952, doi: 10.1109/TUFFC.2016.2518122.
Dong et al., "High-speed programmable photonic circuits in a cryogenically compatible, visible-near-infrared 200 mm CMOS architecture", Nature Photonics, vol. 16, Jan. 2022, pp. 59-65, doi: 10.1038/s41566-021-00903-x.
Dong et al., "Observation of fundamental thermal noise in optical fibers down to infrasonic frequencies", Applied Physics Letters, vol. 108, No. 2, Article 021108, Jan. 12, 2016, pp. 021108-1-021108-4, doi: 10.1063/1.4939918.
Drever et al., "Laser Phase and Frequency Stabilization Using an Optical Resonator", Applied Physics B, vol. 31, Jun. 1983, pp. 97-105, doi: 10.1007/BF00702605.
Du et al., "Precise control of coupling strength in photonic molecules over a wide range using nanoelectromechanical systems", Scientific Reports, vol. 6, Article 24766, Apr. 21, 2016, 9 pgs., doi: 10.1038/srep24766.
Duan, "General treatment of the thermal noises in optical fibers", Physical Review A, vol. 86, No. 023817, Aug. 9, 2012, pp. 023817-1-023817-8, doi: 10.1103/PhysRevA.86.023817.
Duan, "Intrinsic thermal noise of optical fibres due to mechanical dissipation", Electronics Letters, vol. 46, No. 22, Oct. 28, 2010, pp. 1515-1516, doi: 10.1049/el.2010.1653.
Eggleton et al., "Brillouin integrated photonics", Nature Photonics, vol. 13, Aug. 19, 2019, pp. 664-677, doi: 10.1038/s41566-019-0498-z.
Elshaari et al., "Hybrid integrated quantum photonic circuits", Nature Photonics, vol. 14, Apr. 13, 2020, pp. 285-298, doi: 10.1038/s41566-020-0609-x.
Elshaari et al., "Thermo-Optic Characterization of Silicon Nitride Resonators for Cryogenic Photonic Circuits", IEEE Photonics Journal, vol. 8, No. 3, Article 2701009, Jun. 2016, 9 pgs., doi: 10.1109/JPHOT.2016.2561622.
Ely et al., "Using the Deep Space Atomic Clock for Navigation and Science", IEEE Transactions on Ultrasonics, Ferroelectrics, and Frequency Control, vol. 65, No. 6, Jun. 2018, pp. 950-961, doi: 10.1109/TUFFC.2018.2808269.
Epping et al., "Ultra-low-power stress-optics modulator for microwave photonics", Proceedings of SPIE, Integrated Optics: Devices, Materials, and Technologies XXI, vol. 10106, Article 101060F, Feb. 16, 2017, pp. 101060F-1-101060F-8, doi: 10.1117/12.2266170.
Estep et al., "Magnetic-free non-reciprocity and isolation based on parametrically modulated coupled-resonator loops", Nature Physics, vol. 10, Nov. 10, 2014, pp. 923-927, doi: 10.1038/nphys3134.
Everhardt et al., "Ultra-low power stress-based phase actuation in TriPleX photonic circuits", Proceedings of SPIE, Integrated Optics: Devices, Materials, and Technologies XXVI, vol. 12004, Article 1200405, Mar. 5, 2022, pp. 1200405-1-1200405-7, doi: 10.1117/12.2609405.
Fadley, "X-ray photoelectron spectroscopy: Progress and perspectives", Journal of Electron Spectroscopy and Related Phenomena, vol. 178-179, May 2010, pp. 2-32, doi: 10.1016/j.elspec.2010.01.006.
Fan et al., "Atom based RF electric field sensing", Journal of Physics B: Atomic, Molecular and Optical Physics, vol. 48, Article 202001, Sep. 9, 2015, 16 pgs., doi: 10.1088/0953-4075/48/20/202001.
Li et al., "Characterization of a high coherence, Brillouin microcavity laser on silicon", Optics Express, vol. 20, No. 18, Aug. 20, 2012, pp. 20170-20180, doi: 10.1364/OE.20.020170.
Li et al., "High-precision and fast-response laser power stabilization system for cold atom experiments", AIP Advances, vol. 8, No. 9, Sep. 21, 2018, pp. 095221-1-095221-9, doi: 10.1063/1.5040238.
Li et al., "Lithium niobate photonic-crystal electro-optic modulator", Nature Communications, vol. 11, No. 4123, Aug. 17, 2020, 8 pgs., doi: 10.1038/s41467-020-17950-7.
Li et al., "Microwave synthesizer using an on-chip Brillouin oscillator", Nature Communications, vol. 4, Article 2097, Jun. 28, 2013, 7 pgs., doi: 10.1038/ncomms3097.
Li et al., "Sideband spectroscopy and dispersion measurement in microcavities", Optics Express, vol. 20, No. 24, Nov. 7, 2012, pp. 26337-26344, doi: 10.1364/OE.20.026337.
Li et al., "Stably accessing octave-spanning microresonator frequency combs in the soliton regime", Optica, vol. 4, No. 2, Feb. 2017, pp. 193-203, doi: 10.1364/OPTICA.4.000193.
Liang et al., "Compact stabilized semiconductor laser for frequency metrology", Applied Optics, vol. 54, No. 11, Apr. 10, 2015, pp. 3353-3359, doi: 10.1364/AO.54.003353.
Liang et al., "Integrated finely tunable microring laser on silicon", Nature Photonics, vol. 10, Sep. 12, 2016, pp. 719-722, doi: 10.1038/nphoton.2016.163.
Liang et al., "Ultralow noise miniature external cavity semiconductor laser", Nature Communications, vol. 6, Article 7371, Jun. 24, 2015, 6 pgs., doi: 10.1038/ncomms8371.
Liao et al., "Dependence of a microresonator Kerr frequency comb on the pump linewidth", Optics Letters, vol. 42, No. 4, Feb. 15, 2017, pp. 779-782, doi: 10.1364/OL.42.000779779-782.
Liao et al., "Photonic molecule quantum optics", Advances in Optics and Photonics, vol. 12, No. 1, Mar. 6, 2020, pp. 60-134, doi: 10.1364/AOP.376739.

(56) References Cited

OTHER PUBLICATIONS

Lihachev et al., "Low-noise frequency-agile photonic integrated lasers for coherent ranging", Nature Communications, vol. 13, No. 1, Article 3522, Jun. 20, 2022, 10 pgs., doi: 10.1038/s41467-022-30911-6.
Lim et al., "Chasing the thermodynamical noise limit in whispering-gallery-mode resonators for ultrastable laser frequency stabilization", Nature Communications, vol. 8, No. 1, Article 8, Mar. 31, 2017, 7 pgs., doi: 10.1038/s41467-017-00021-9.
Lim et al., "Probing 10 muK stability and residual drifts in the cross-polarized dual-mode stabilization of single-crystal ultra-high-Q optical resonators", Light, Science & Applications, vol. 8, Article 1, Jan. 3, 2019, 9 pgs., doi: 10.1038/s41377-018-0109-7.
Link et al., "Dual-comb spectroscopy of water vapor with a free-running semiconductor disk laser", Science, vol. 356, No. 6343, May 11, 2017, pp. 1164-1168, doi: 10.1126/science.aam7424.
Lisdat et al., "A clock network for geodesy and fundamental science", Nature Communications, vol. 7, Article 12443, Aug. 9, 2016, 7 pgs., doi: 10.1038/ncomms12443.
Liu et al., "36 Hz Integral Linewidth Laser Based on a Photonic Integrated 4.0 M Coil Resonator", Optica, vol. 9, No. 7, Jul. 7, 2022, pp. 770-775, doi: 10.1364/OPTICA.451635.
Liu et al., "720 Million Quality Factor Integrated All-Waveguide Photonic Resonator", Device Research Conference (DRC), Jun. 20, 2021, 2 pgs., doi: 10.1109/DRC52342.2021.9467132.
Liu et al., "Digital Signal Processing Techniques Enabling Multi-Tb/s Superchannel Transmission", IEEE Signal Processing Magazine, vol. 31, No. 2, Mar. 2014, pp. 16-24, doi: 10.1109/MSP.2013.2285934.
Liu et al., "Heterogeneous silicon widely-tunable lasers with monolithically integrated high-Q ring", Conference on Lasers and Electro-Optics (CLEO), paper SW4C.3, May 14-19, 2017, 2 pgs., doi: 10.1364/CLEO_SI.2017.SW4C.3.
Liu et al., "High-channel-count 20 GHz passively mode-locked quantum dot laser directly grown on Si with 4.1 Tbit/s transmission capacity", Optica, vol. 6, No. 2, Feb. 2019, pp. 128-134, doi: 10.1364/OPTICA.6.000128.
Liu et al., "High-yield, wafer-scale fabrication of ultralow-loss, dispersion-engineered silicon nitride photonic circuits", Nature Communications, vol. 12, Article 2236, Apr. 16, 2021, 9 pgs., doi: 10.1038/s41467-021-21973-z.
Liu et al., "Monolithic piezoelectric control of soliton microcombs", Nature, vol. 583, No. 7816, Jul. 16, 2020, pp. 385-390, doi: 10.1038/s41586-020-2465-8.
Liu et al., "Photonic circuits for laser stabilization with integrated ultra-high Q and Brillouin laser resonators", APL Photonics, vol. 7, No. 9, Article 096104, Sep. 21, 2022, pp. 096104-1-096104-9, doi: 10.1063/5.0091686.
Liu et al., "Photonic circuits for laser stabilization with ultra-low-loss and nonlinear resonators", arXiv:2107.03595v1 [physics.optics], Jul. 8, 2021, 21 pgs.
Liu et al., "Photonic integrated cascade-inhibited Brillouin laser with sub-100-mHz fundamental linewidth", Conference on Lasers and Electro-Optics, Technical Digest Series (Optica Publishing Group), 2022, 2 pgs., doi: 10.1364/CLEO_SI.2022.SF2K.1.
Liu et al., "Semiconductor laser stabilized by a photonic integrated 4 meter coil-waveguide resonator", Optical Fiber Communications Conference and Exhibition (OFC), 2022, 3 pgs., doi: 10.1364/OFC.2022.Tu3D.2.
Liu et al., "Ultralow 0.034 dB/m loss wafer-scale integrated photonics realizing 720 million Q and 380 μW threshold Brillouin lasing", Optics Letters, vol. 47, No. 7, Apr. 1, 2022, pp. 1855-1858, doi: 10.1364/OL.454392.
Loh et al., "A microrod-resonator Brillouin laser with 240 Hz absolute linewidth", New Journal of physics, vol. 18, No. 045001, Apr. 4, 2016, 9 pgs., doi: 10.1088/1367-2630/18/4/045001.
Loh et al., "Dual-microcavity narrow-linewidth Brillouin laser", Optica, vol. 2, No. 3, Mar. 5, 2015, pp. 225-232, doi: 10.1364/OPTICA.2.000225.
Loh et al., "Microresonator Brillouin laser stabilization using a microfabricated rubidium cell", Optics Express, vol. 24, No. 13, Jun. 17, 2016, pp. 14513-14524, doi: 10.1364/OE.24.014513.
Loh et al., "Operation of an optical atomic clock with a Brillouin laser subsystem", Nature, vol. 588, No. 7837, Dec. 10, 2020, pp. 244-249, doi: 10.1038/s41586-020-2981-6.
Loh et al., "Ultra-narrow linewidth Brillouin laser with nanokelvin temperature self-referencing", Optica, vol. 6, No. 2, Feb. 2019, pp. 152-159, doi: 10.1364/OPTICA.6.000152.
Lu et al., "A Narrow-Linewidth On-Chip Toroid Raman Laser", IEEE Journal of Quantum Electronics, vol. 47, No. 3, Mar. 2011, pp. 320-326, doi: 10.1109/JQE.2010.2087742.
Lu et al., "Topological photonics", Nature Photonics, vol. 8, No. 201, Oct. 26, 2014, pp. 821-829, doi: 10.1038/nphoton.2014.248.
Ludlow et al., "Optical atomic clocks", Reviews of Modern Physics, vol. 87, No. 2, Apr.-Jun. 2015, pp. 637-701, doi: 10.1103/RevModPhys.87.637.
Lundberg et al., "Phase-coherent lightwave communications with frequency combs", Nature Communications, vol. 11, Article 201, Jan. 10, 2020, 7 pgs., doi: 10.1038/s41467-019-14010-7.
Ma et al., "Delivering the same optical frequency at two places: accurate cancellation of phase noise introduced by an optical fiber or other time-varying path", Optics Letters, vol. 19, No. 21, Nov. 1, 1994, pp. 1777-1779, doi: 10.1364/OL.19.001777.
Magden et al., "Laser Frequency Stabilization Using Pound-Drever-Hall Technique with an Integrated TiO2 Athermal Resonator", Conference on Lasers and Electro-Optics (CLEO), paper STu1H.3, Jun. 5-10, 2016, 2 pgs., doi: 10.1364/CLEO_SI.2016.STu1H.3.
Mahajan et al., "Co-Packaged Photonics for High Performance Computing: Status, Challenges and Opportunities", Journal of Lightwave Technology, vol. 40, No. 2, Jan. 15, 2022, pp. 379-392, doi: 10.1109/jlt.2021.3104725.
Manipatruni et al., "Wide temperature range operation of micrometer-scale silicon electro-optic modulators", Optics Letters, vol. 33, No. 19, Oct. 1, 2008, pp. 2185-2187, doi: 10.1364/OL.33.002185.
Marin-Palomo et al., "Microresonator-based solitons for massively parallel coherent optical communications", Nature, vol. 546, Jun. 8, 2017, pp. 274-279, doi: 10.1038/nature22387.
Marpaung et al., "Integrated microwave photonics", Laser & Photonic Reviews, vol. 7, No. 4, Jul. 2013, pp. 506-538, doi: 10.1002/lpor.201200032.
Marpaung et al., "Integrated microwave photonics", Nature Photonics, vol. 13, Feb. 2019, pp. 80-90, doi: 10.1038/s41566-018-0310-5.
Martin et al., "Compact Optical Atomic Clock Based on a Two-Photon Transition in Rubidium", Physical Review Applied, vol. 9, No. 1, Article 014019, Jan. 18, 2018, pp. 014019-1-014019-10, doi: 10.1103/PhysRevApplied.9.014019.
Matei et al., "1.5 μm lasers with sub-10 mHz Linewidth", Physical Review Letter, vol. 118, Article 263202, Jun. 28, 2017, pp. 263202-1-263202-6, doi: 10.1103/PhysRevLett.118.263202.
Matsko et al., "Whispering-gallery-mode resonators as frequency references. I. Fundamental limitations", Journal of the Optical Society of America B, vol. 24, No. 6, Jun. 2007, pp. 1324-1335, doi: 10.1364/JOSAB.24.001324.
Maurya et al., "Recent Developments in R.F. Magnetron Sputtered Thin Films for pH Sensing Applications—An Overview", Coatings, vol. 4, No. 4, Dec. 1, 2014, pp. 756-771, doi: 10.3390/coatings4040756.
Mazzalai et al., "Characterization and Fatigue of the Converse Piezoelectric Effect in PZT Films for MEMS Applications", Journal of Microelectromechanical Systems, vol. 24, No. 4, Aug. 2015, pp. 831-838, doi: 10.1109/JMEMS.2014.2353855.
McGehee et al., "Magneto-optical trapping using planar optics", New Journal of Physics, vol. 23, No. 013021, Jan. 29, 2021, 9 pgs., doi: 10.1088/1367-2630/abdce3.
Meyer et al., "Assessment of Rydberg atoms for wideband electric field sensing", Journal of Physics B: Atomic, Molecular and Optical Physics, vol. 53, No. 3, Article 034001, 2020, 12 pgs., doi: 10.1088/1361-6455/ab6051.
Miller et al., "Electro-optic effect in silicon nitride", Conference on Lasers and Electro-Optics (CLEO), paper SF1G.4, 2015, 2 pgs., doi: 10.1364/CLEO_SI.2015.SF1G.4.

(56) References Cited

OTHER PUBLICATIONS

Mills, "The Cloud Begins with Coal", Digital Power Group, Retrieved from Internet: <https://www.tech-pundit.com/wp-content/uploads/2013/07/Cloud_Begins_With_Coal.pdf?c761ac&c761ac>, Retreived on Aug. 27, 2025, 44 pgs.

Mitchell et al., "Highly selective and vertical etch of silicon dioxide using ruthenium films as an etch mask", Journal of Vacuum Science and Technology A, vol. 39, No. 4, Jul./Aug. 2021, pp. 043204-1-043204-12, doi: 10.1116/6.0001030.

Mooradian, "Laser Linewidth", Physics Today, vol. 38, No. 5, May 1985, pp. 42-48, doi: 10.1063/1.880973.

Morandotti et al., "Experimental Observation of Linear and Nonlinear Optical Bloch Oscillations", Physical Review Letters, vol. 83, No. 23, Dec. 6, 1999, pp. 4756-4759, doi: 10.1103/PhysRevLett.83.4756.

Moreira et al., "Optical Interconnect for 3D Integration of Ultra-Low Loss Planar Lightwave Circuits", Advanced Photonics, OSA Technical Digest (online) (Optica Publishing Group), 2013, 3 pgs., doi: 10.1364/iprsn.2013.it2a.4.

Morsy-Osman et al., "DSP-free 'coherent-lite' transceiver for next generation single wavelength optical intra-datacenter interconnects", Optics Express vol. 26, No. 7, Apr. 2, 2018, pp. 8890-8903, doi: 10.1364/OE.26.008890.

Morton et al., "High-Power, Ultra-Low Noise Hybrid Lasers for Microwave Photonics and Optical Sensing", Journal of Lightwave Technology, vol. 36, No. 21, Nov. 1, 2018, pp. 5048-5057, doi: 10.1109/JLT.2018.2817175.

Morton et al., "Ultra Low Phase Noise, High Power, Hybrid Lasers for RF Mixing and Optical Sensing Applications", IEEE Avionics and Vehicle Fiber-Optics and Photonics Conference (AVFOP), 2017, 2 pgs., doi: 10.1109/AVFOP.2017.8169763.

Nakazawa et al., "Extremely Higher-Order Modulation Formats", Optical Fiber Telecommunications VIB, Chapter 7, May 13, 2013, pp. 297-336, doi: 10.1016/B978-0-12-396960-6.00007-9.

Nazarathy et al., "Spectral Analysis of Optical Mixing Measurements", Journal of Lightwave Technology, vol. 7, No. 7, Jul. 1989, pp. 1083-1096, doi: 10.1109/50.29635.

Newman et al., "Architecture for the photonic integration of an optical atomic clock", Optica, vol. 6, No. 5, May 2019, pp. 680-685, doi: 10.1364/OPTICA.6.000680.

Nguyen et al., "Large piezoelectric strain with ultra-low strain hysteresis in highly c-axis oriented Pb(Zr0.52Ti0.48)O3 films with columnar growth on amorphous glass substrates", Scientific Reports, vol. 7, No. 1, Article 12915, Oct. 10, 2017, 9 pgs., doi: 10.1038/s41598-017-13425-w.

Nicati et al., "Frequency Stability of a Brillouin Fiber Ring Laser", Journal of Lightwave Technology, vol. 13, No. 7, Jul. 1995, pp. 1445-1451, doi: 10.1109/50.400710.

Nicholes et al., "An 8×8 InP Monolithic Tunable Optical Router (MOTOR) Packet Forwarding Chip", Journal of Lightwave Technology, vol. 28, No. 4, Feb. 15, 2010, pp. 641-650, doi: 10.1109/JLT.2009.2030145.

Niffenegger et al., "Integrated multi-wavelength control of an ion qubit", Nature, vol. 586, No. 7830, Oct. 22, 2020, pp. 538-542, doi: 10.1038/s41586-020-2811-x.

Notcutt et al., "Contribution of thermal noise to frequency stability of rigid optical cavity via Hertz-linewidth lasers", Physical Review A, vol. 73, No. 031804(R), Mar. 21, 2006, pp. 031804-1-031804-4, doi: 10.1103/PhysRevA.73.031804.

Numata et al., "Thermal-Noise Limit in the Frequency Stabilization of Lasers with Rigid Cavities", Physical Review Letters, vol. 93, No. 250602, Dec. 17, 2004, pp. 250602-1-250602-4, doi: 10.1103/PhysRevLett.93.250602.

Olmschenk et al., "Manipulation and detection of a trapped Yb+ Hyperfine Qubit", Physical Review A, vol. 76, No. 5, Article 052314, Nov. 19, 2007, pp. 052314-1-052314-9, doi: 10.1103/PhysRevA.76.052314.

Olsson et al., "Probabilistically shaped PDM 4096-QAM transmission over up to 200 km of fiber using standard intradyne detection", Optics Express, vol. 26, No. 4, Feb. 19, 2018, pp. 4522-4530, doi: 10.1364/OE.26.004522.

Orieux et al., "Recent advances on integrated quantum communications", Journal of Optics, vol. 18, No. 8, Article 083002, Jul. 20, 2016, 13 pgs., doi: 10.1088/2040-8978/18/8/083002.

Osinsky et al., "Optical loss mechanisms in GeSiON planar waveguides", Applied Physics Letters, vol. 81, No. 11, Sep. 9, 2022, pp. 2002-2004, doi: 10.1063/1.1507611.

Padmaraju et al., "Resolving the thermal challenges for silicon microring resonator devices", Nanophotonics, vol. 3, No. 4-5, 2014, pp. 269-281, doi: 10.1515/nanoph-2013-0013.

Papp et al., "Mechanical Control of a Microrod-Resonator Optical Frequency Comb", Physical Review X, vol. 3, No. 031003, Jul. 8, 2013, pp. 031003-1-031003-7, doi: 10.1103/PhysRevX.3.031003.

Park et al., "40Gbit/s coherent optical receiver using a Costas loop", Optics Express, vol. 20, No. 26, Nov. 28, 2012, pp. B197-B203, doi: 10.1364/OE.20.00B197.

Perin et al., "Data center links beyond 100 Gbit/s per wavelength", Optical Fiber Technology, vol. 44, Aug. 2018, pp. 69-85, doi: 10.1016/j.yofte.2017.12.006.

Perin et al., "Design of Low-Power DSP-Free Coherent Receivers for Data Center Links", Journal of Lightwave Technology, vol. 35, No. 21, Nov. 1, 2017, pp. 4650-4662, doi: 10.1109/JLT.2017.2752079.

Petrov et al., "Features of magnetic field stabilization in caesium atomic clock for satellite navigation system", Journal of Physics: Conference Series, vol. 1038, No. 2018, Article 012032, Oct. 24-26, 2017, 7 pgs., doi: 10.1088/1742-6596/1038/1/012032.

Pfeiffer et al., "Ultra-smooth silicon nitride waveguides based on the Damascene reflow process: fabrication and loss origins", Optica, vol. 5, No. 7, Jul. 20, 2018, pp. 884-892, doi: 10.1364/OPTICA.5.000884.

Pfeifle et al., "Coherent terabit communications with microresonator Kerr frequency combs", Nature Photonics, vol. 8, May 2014, pp. 375-380, doi: 10.1038/nphoton.2014.57.

Pillai et al., "End-to-End Energy Modeling and Analysis of Long-Haul Coherent Transmission Systems", Journal of Lightwave Technology, vol. 32, No. 8, Sep. 15, 2014, pp. 3093-3111, doi: 10.1109/JLT.2014.2331086.

Popovic et al., "Multistage high-order microring-resonator add-drop filters", Optics Letters, vol. 31, No. 17, Sep. 1, 2006, pp. 2571-2573, doi: 10.1364/OL.31.002571.

Puckett et al., "422 Million intrinsic quality factor planar integrated all-waveguide resonator with sub-MHz linewidth", Nature Communications, vol. 12, Article 934, Feb. 10, 2021, 8 pgs., doi: 10.1038/s41467-021-21205-4.

Puckett et al., "422 Million Q Planar Integrated All-Waveguide Resonator with a 3.4 Billion Absorption Limited Q and Sub-MHz Linewidth", arXiv:2009.07428v1 [physics.optics], Sep. 16, 2020, 20 pgs.

Qiu et al., "An athermal hybrid silicon/polymer ring resonator electro-optic modulator", ACS Photonics, vol. 3, No. 5, Apr. 13, 2016, pp. 780-783, doi: 10.1021/acsphotonics.5b00695.

Qiu et al., "Athermal and High-Q Hybrid TiO2—Si3N4 Ring Resonator via an Etching-Free Fabrication Technique", ACS Photonics, vol. 2, No. 3, Feb. 25, 2015, pp. 405-409, doi: 10.1021/ph500450n.

Rafilov et al., "Mode-locked quantum-dot lasers", Nature Photonics, vol. 1, No. 7, Jul. 2007, pp. 395-401, doi: 10.1038/nphoton.2007.120.

Ramdas, "The Thermo-Optic Behaviour of Quartz", Proceedings of the Indian Academy of Sciences, vol. 35, Article 89, Feb. 1952, pp. 89-98, doi: 10.1007/BF03172491.

Raza et al., "High index contrast photonic platforms for on-chip Raman spectroscopy", Optics Express, vol. 27, No. 16, Aug. 5, 2019, pp. 23067-23079, doi: 10.1364/OE.27.023067.

Regensburger et al., "Parity-time synthetic photonic lattices", Nature, vol. 488, No. 7410, Aug. 9, 2012, pp. 167-171, doi: 10.1038/nature11298.

(56) References Cited

OTHER PUBLICATIONS

Richardson et al., "Space-division multiplexing in optical fibres", Nature Photonics, vol. 7, May 2013, pp. 354-362, doi: 10.1038/nphoton.2013.94.
Riehle, "Optical clock networks", Nature Photonics, vol. 11, No. 9, Jan. 2017, pp. 25-31, doi: 10.1038/nphoton.2016.235.
Roberts et al., "Search for transient variations of the fine structure constant and dark matter using fiber-linked optical atomic clocks", New Journal of Physics, vol. 22, No. 093010, Sep. 4, 2020, 11 pgs., doi: 10.1088/1367-2630/abaace.
Roeloffzen et al., "Silicon nitride microwave photonic circuits", Optics Express, vol. 21, No. 19, Sep. 23, 2013, pp. 22937-22961, doi: 10.1364/OE.21.022937.
Sato et al., "Strong coupling between distant photonic nanocavities and its dynamic control", Nature Photonics, vol. 6, No. 1, Jan. 2012, pp. 56-61, doi: 10.1038/nphoton.2011.286.
Satyan et al., "Phase noise reduction of a semiconductor laser in a composite optical phase-locked loop", Optical Engineering, vol. 49, No. 12, Article 124301, Dec. 2010, pp. 124301-1-124301-6, doi: 10.1117/1.3518077.
Savchenkov et al., "Calcium fluoride whispering gallery mode optical resonator with reduced thermal sensitivity", Journal of Optics, vol. 20, No. 3, Jan. 29, 2018, 4 pgs., doi: 10.1088/2040-8986/aaa6f9.
Fan et al., "Hybrid integrated InP—Si3N4 diode laser with a 40-Hz intrinsic linewidth", Optics Express, vol. 28, No. 15, Jul. 20, 2020, pp. 21713-21728, doi: 10.1364/OE.398906.
Fatadin et al., "Laser Linewidth Tolerance for 16-QAM Coherent Optical Systems Using QPSK Partitioning", IEEE Photonics Technology Letters, vol. 22, No. 9, May 1, 2010, pp. 631-633, doi: 10.1109/LPT.2010.2043524.
Fescenko et al., "Dual-mode temperature compensation technique for laser stabilization to a crystalline whispering gallery mode resonator", Optics Express, vol. 20, No. 17, Aug. 13, 2012, pp. 19185-19193, doi: 10.1364/OE.20.019185.
Flamini et al., "Photonic quantum information processing: a review", Reports on Progress in Physics, vol. 82, No. 1, Article 016001, 2019, 32 pgs., doi: 10.1088/1361-6633/aad5b2.
Foreman et al., "Coherent Optical Phase Transfer over a 32-km Fiber with 1 s Instability at 10-17", Physical Review Letters, vol. 99, Article 153601, Oct. 12, 2007, pp. 153601-1-153601-4, doi: 10.1103/PhysRevLett.99.153601.
Franchimon et al., "Interaction of whispering gallery modes in integrated optical microring or microdisk circuits: hybrid coupled mode theory model", Journal of the Optical Society of America B, vol. 30, No. 4, Apr. 2013, pp. 1048-1057, doi: 10.1364/JOSAB.30.001048.
Frigg et al., "Low loss CMOS-compatible silicon nitride photonics utilizing reactive sputtered thin films", Optics Express, vol. 27, No. 26, Dec. 23, 2019, pp. 37795-37805, doi: 10.1364/OE.380758.
Frigg et al., "Optical frequency comb generation using low stress CMOS compatible reactive sputtered silicon nitride waveguides", Proceedings of SPIE, Integrated Photonics Platforms: Fundamental Research, Manufacturing and Applications, vol. 11364, Apr. 2, 2020, pp. 113640N-1-113640N-8, doi: 10.1117/12.2564640.
Fujieda et al., "All-optical link for direct comparison of distant optical clocks", Optics Express, vol. 19, No. 17, Aug. 15, 2011, pp. 16498-16507, doi: 10.1364/OE.19.016498.
Gaeta et al., "Photonic-chip-based frequency combs", Nature Photonics, vol. 13, Mar. 2019, pp. 158-169, doi: 10.1038/s41566-019-0358-x.
Gardner, "Phaselock Techniques", Third Edition, Wiley-Interscience, 2005, 445 pgs. (Presented in 2 parts).
Gevorgyan et al., "Active-cavity photonic molecule optical data wavelength converter for silicon photonics platforms", arXiv:2005.04989v1 [physics.optics], May 11, 2020, 6 pgs.
Gil-Santos et al., "High-precision spectral tuning of micro and nanophotonic cavities by resonantly enhanced photoelectrochemical etching", Nature Communications, vol. 8, No. 14267, Jan. 24, 2017, 8 pgs., doi: 10.1038/ncomms14267.
Golshani et al., "Low-loss, low-temperature PVD SiN waveguides", IEEE 17th International Conference on Group IV Photonics, Dec. 2021, 2 pgs., doi: 10.1109/GFP51802.2021.9673874.
Gorodetsky et al., "Fundamental thermal fluctuations in microspheres", Journal of the Optical Society of America B, vol. 21, No. 4, Apr. 2004, pp. 697-705, doi: 10.1364/JOSAB.21.000697.
Grotti et al., "Geodesy and metrology with a transportable optical clock", Nature Physics, vol. 14, No. 5, Feb. 12, 2018, pp. 437-441, doi: 10.1038/s41567-017-0042-3.
Gumyusenge et al., "High Temperature Organic Electronics", MRS Advances, Materials Research Society, vol. 5, No. 10, 2020, pp. 505-513, doi: 10.1557/adv.2020.31.
Gundavarapu et al., "Integrated Waveguide Brillouin Laser", arXiv:1709.04512v1 [physics.optics], Sep. 13, 2017, 15 pgs.
Gundavarapu et al., "Interferometric Optical Gyroscope Based on an Integrated Si3N4 Low-Loss Waveguide Coil", Journal of Lightwave Technology, vol. 36, No. 4, Feb. 15, 2018, pp. 1185-1191, doi: 10.1109/JLT.2017.2765918.
Gundavarapu et al., "Sub-hertz fundamental linewidth photonic integrated Brillouin laser", Nature Photonics, vol. 13, Jan. 2019, pp. 60-67, doi: 10.1038/s41566-018-0313-2.
Guzzon et al., "Spurious-Free Dynamic Range in Photonic Integrated Circuit Filters with Semiconductor Optical Amplifiers", IEEE Journal of Quantum Electronics, vol. 48, No. 2, Feb. 2012, pp. 269-278, doi: 10.1109/JQE.2011.2174618.
Hafner et al., "8×10−17 fractional laser frequency instability with a long room-temperature cavity", Optics Letters, vol. 40, No. 9, May 1, 2015, pp. 2112-2115, doi: 10.1364/OL.40.002112.
Hainberger et al., "PECVD silicon nitride optical waveguide devices for sensing applications in the visible and <1μm near infrared wavelength region", Proceedings of SPIE, vol. 11031, Article 110310A, 2019, pp. 110310A-1-110310A-8, doi: 10.1117/12.2524277.
Hansel et al., "Opportunities for photonic integrated circuits in optical gas sensors", Journal of Physics: Photonics, vol. 2, No. 1, Article 012002, Jan. 23, 2020, 17 pgs., doi: 10.1088/2515-7647/ab6742.
Harish et al., "Optimization of Phase Modulation Formats for Suppression of Stimulated Brillouin Scattering in Optical Fibers", IEEE Journal of Selected Topics in Quantum Electronics, vol. 24, No. 3, May/Jun. 2018, 10 pgs., doi: 10.1109/JSTQE.2017.2753041.
Harrington et al., "Kerr Soliton Microcomb Pumped by an Integrated SBS Laser for Ultra-Low Linewidth WDM Sources", Optical Fiber Communications Conference (OFC), paper T4G.6, 2020, 3 pgs., doi: 10.1364/OFC.2020.T4G.6.
Hartmann et al., "Quantum many-body phenomena in coupled cavity arrays", Laser & Photonics Review, vol. 2, No. 6, Dec. 2008, pp. 527-556, doi: 10.1002/lpor.200810046.
Haus et al., "Coupled-Mode Theory", Proceedings of the IEEE, vol. 79, No. 10, Oct. 1991, pp. 1505-1518, doi: 10.1109/5.104225.
He et al., "Broadband athermal waveguides and resonators for datacom and telecom applications", Photonics Research, vol. 6, No. 11, Nov. 2018, pp. 987-990, doi: 10.1364/PRJ.6.000987.
Helgason et al., "Dissipative solitons in photonic molecules", Nature Photonics, vol. 15, No. 4, Apr. 2021, pp. 305-310, doi: 10.1038/s41566-020-00757-9.
Hermans et al., "Integrated silicon nitride electro-optic modulators with atomic layer deposited overlays", Optics Letters, vol. 44, No. 5, Mar. 1, 2019, pp. 1112-1115, doi: 10.1364/ol.44.001112.
Herr et al., "Universal formation dynamics and noise of Kerr-frequency combs in microresonators", Nature Photonics, vol. 6, No. 7, Jun. 24, 2012, pp. 480-487, doi: 10.1038/nphoton.2012.127.
Hirata et al., "Sub-hertz-linewidth diode laser stabilized to an ultralow-drift high-finesse optical cavity", Applied Physics Express, vol. 7, No. 2, Jan. 30, 2014, pp. 022705-1-022705-4, doi: 10.7567/APEX.7.022705.
Hjelme et al., "Semiconductor Laser Stabilization by External Optical Feedback", IEEE Journal of Quantum Electronics, vol. 27, No. 3, Mar. 1991, pp. 352-372, doi: 10.1109/3.81333.
Horak et al., "On the delayed self-heterodyne interferometric technique for determining the linewidth of fiber lasers", Optics Express, vol. 14, No. 9, Apr. 19, 2006, pp. 3923-3928, doi: 10.1364/oe.14.003923.

(56) References Cited

OTHER PUBLICATIONS

Hosseini et al., "Stress-optic modulator in TriPlex platform using a piezoelectric lead zirconate titanate (PZT) thin film", Optics Express, vol. 23, No. 11, May 19, 2015, pp. 14018-14026, doi: 10.1364/oe.23.014018.
Hu et al., "Reconfigurable electro-optic frequency shifter", arXiv:2005.09621v1 [physics.optics], May 19, 2020, 12 pgs.
Huang, "Stress effects on the performance of optical waveguides", International Journal of Solids and Structures, vol. 40, No. 7, Apr. 2003, pp. 1615-1632, doi: 10.1016/S0020-7683(03)00037-4.
Huang et al., "Effect of deposition conditions on mechanical properties of low-temperature PECVD silicon nitride films", Materials Science and Engineering: A, vol. 435-436, Nov. 5, 2006, pp. 453-459, doi: 10.1016/j.msea.2006.07.015.
Huang et al., "High-power sub-kHz linewidth lasers fully integrated on silicon", Optica, vol. 6, No. 6, Jun. 2019, pp. 745-752, doi: 10.1364/OPTICA.6.000745.
Huang et al., "Thermorefractive noise in silicon-nitride microresonators", Physical Review A, vol. 99, No. 061801(R), Jun. 24, 2019, pp. 061801-1-061801-5, doi: 10.1103/PhysRevA.99.061801.
Huffman, "Integrated Si3N4 Waveguide Circuits for Single- and Multi-Layer Applications", Dissertation, University of California, Santa Barbara, Dec. 2018, 129 pgs.
Huffman et al., "High Extinction Ratio Widely Tunable Low-Loss Integrated Si3N4 Third-Order Filter", arXiv:1708.06344v1 [physics.app-ph], Aug. 21, 2017, 12 pgs.
Huffman et al., "Integrated Resonators in an Ultralow Loss Si3N4/SiO2 Platform for Multifunction Applications", IEEE Journal of Selected Topics in Quantum Electronics, vol. 24, No. 4, Jul./Aug. 2018, 9 pgs., doi: 10.1109/JSTQE.2018.2818459.
Huffman et al., "Ultra-Low Loss Large Area Waveguide Coils for Integrated Optical Gyroscopes", IEEE Photonics Technology Letters, vol. 29, No. 2, Jan. 15, 2017, pp. 185-188, doi: 10.1109/LPT.2016.2620433.
Hulme et al., "Fully integrated microwave frequency synthesizer on heterogeneous silicon—III/V", Optics Express, vol. 25, No. 3, Feb. 6, 2017, pp. 2422-2431, doi: 10.1364/OE.25.002422.
Hummon et al., "Photonic chip for laser stabilization to an atomic vapor with 10-11 instability", Optica, vol. 5, No. 4, Apr. 2018, pp. 443-449, doi: 10.1364/OPTICA.5.000443.
Hung Lai et al., "780 nm narrow-linewidth self-injection-locked WGM lasers", Laser Resonators, Microresonators, and Beam Control XXII, vol. 11266, Article 1126600, Mar. 2, 2020, pp. 112660O-1-112660O-7, doi: 10.1117/12.2553258.
Ikeda et al., "Thermal and Kerr nonlinear properties of plasma-deposited silicon nitride/ silicon dioxide waveguides", Optics Express, vol. 16, No. 17, Aug. 11, 2008, pp. 12987-12994, doi: 10.1364/oe.16.012987.
Ilchenko et al., "Crystal quartz optical whispering-gallery resonators", Optics Letters, vol. 33, No. 14, Jul. 15, 2008, pp. 1569-1571, doi: 10.1364/OL.33.001569.
Ip et al., "Coherent detection in optical fiber systems", Optics Express, vol. 16, No. 2, Jan. 9, 2008, pp. 753-791, doi: 10.1364/oe.16.000753.
Isichenko et al., "Chip-Scale, Sub-Hz Fundamental Sub-kHz Integral Linewidth 780 nm Laser through Self-Injection-Locking a Fabry-Pérot laser to an Ultra-High Q Integrated Resonator", arXiv:2307.04947v2 [physics.optics], Sep. 7, 2023, 10 pgs.
Isichenko et al., "Cooling rubidium atoms with a photonic integrated 3D magneto-optical trap", Optical Sensors and Sensing Congress, paper STu4G.6, 2022, 2 pgs., doi: 10.1364/SENSORS.2022.STu4G.6.
Jadbabaie et al., "Enhanced molecular yield from a cryogenic buffer gas beam source via excited state chemistry", New Journal of Physics, vol. 22, No. 2, Article 022002, Feb. 13, 2020, 11 pgs., doi: 10.1088/1367-2630/ab6eae.
Jarlov et al., "1D and 2D arrays of coupled photonic crystal cavities with a site-controlled quantum wire light source", Optics Express, vol. 21, No. 25, Dec. 10, 2013, pp. 31082-31091, doi: 10.1364/oe.21.031082.
Ji et al., "Recent Progress in Aromatic Polyimide Dielectrics for Organic Electronic Devices and Circuits", Advanced Materials, vol. 31, No. 15, Article 1806070, Apr. 12, 2019, 19 pgs., doi: 10.1002/adma.201806070.
Ji et al., "Ultra-low-loss on-chip resonators with sub-milliwatt parametric oscillation threshold", Optica, vol. 4, No. 6, Jun. 2017, pp. 619-624, doi: 10.1364/OPTICA.4.000619.
Ji et al., "Ultra-Low-Loss Silicon Nitride Photonics Based on Deposited Films Compatible with Foundries", Laser & Photonics Reviews, vol. 17, No. 3, Article 2200544, Mar. 2023, 18 pgs., doi: 10.1002/lpor.202200544.
Jiang et al., "Long-distance frequency transfer over an urban fiber link using optical phase stabilization", Journal of the Optical Society of America B, vol. 25, No. 12, Dec. 2008, pp. 2029-2035, doi: 10.1364/JOSAB.25.002029.
Jiang et al., "Making optical atomic clocks more stable with 10-16-level laser stabilization", Nature Photonics, vol. 5, Mar. 2011, pp. 158-161, doi: 10.1038/nphoton.2010.313.
Jin et al., "Deuterated silicon dioxide for heterogeneous integration of ultra-low-loss waveguides", Optic Letters, vol. 45, No. 12, Jun. 15, 2020, pp. 3340-3343, doi: 10.1364/OL.394121.
Jin et al., "Hertz-linewidth semiconductor lasers using CMOS-ready ultra-high-Q microresonators", Nature Photonics, vol. 15, No. 5, May 2021, pp. 346-353, doi: 10.1038/s41566-021-00761-7.
Jin et al., "Piezoelectric tuning of a suspended silicon nitride ring resonator", IEEE Photonics Conference (IPC), 2017, pp. 117-118, doi: 10.1109/IPCon.2017.8116029.
Jin et al., "Piezoelectrically tuned silicon nitride ring resonator", Optic Express, vol. 26, No. 3, Feb. 5, 2018, pp. 3174-3187, doi: 10.1364/OE.26.003174.
Joannopoulos et al., "Photonic crystals: putting a new twist on light", Nature, vol. 386, No. 6621, Mar. 13, 1997, pp. 143-149, doi: 10.1038/386143a0.
John, "Etchless Core-Definition Process for the Realization of Low Loss Glass Waveguides", Dissertation, University of California, Santa Barbara, Jun. 2012, 319 pgs.
Jung et al., "Highly reliable low threshold InAs quantum dot lasers on on-axis (001) Si with 87% injection efficiency", ACS Photonics, vol. 5, No. 3, Dec. 18, 2017, pp. 1094-1100, doi: 10.1021/acsphotonics.7b01387.
Jung et al., "Tantala Kerr nonlinear integrated photonics", Optica, vol. 8, No. 6, Jun. 2021, pp. 811-817, doi: 10.1364/OPTICA.411968.
Kakkar et al., "Laser Frequency Noise in Coherent Optical Systems: Spectral Regimes and Impairments", Scientific Reports, vol. 7, No. 1, Article 844, 2017, 10 pgs., doi: 10.1038/s41598-017-00868-4.
Kapfinger et al., "Dynamic acousto-optic control of a strongly coupled photonic molecule", Nature Communications, vol. 6, No. 1, Article 8540, Oct. 5, 2015, 6 pgs., doi: 10.1038/ncomms9540.
Karimelahi et al., "Ring modulator small-signal response analysis based on pole-zero representation", Optics Express, vol. 24, No. 7, Mar. 30, 2016, pp. 7585-7599, doi: 10.1364/OE.24.007585.
Kasap, "Principles of Electronic Materials and Devices", Fourth Edition, McGraw-Hill Higher Education, 2018, 992 pgs. (Presented in 3 parts).
Kazovsky, "Phase- and Polarization-Diversity Coherent Optical Techniques", Journal of Lightwave Technology, vol. 7, No. 2, Feb. 1989, pp. 279-292, doi: 10.1109/50.17768.
Kazovsky et al., "A 1320-nm Experimental Optical Phase-Locked Loop: Performance Investigation and PSK Homodyne Experiments at 140 Mb/s and 2 GB/s", Journal of Lightwave Technology, vol. 8, No. 9, Sep. 1990, pp. 1414-1425, doi: 10.1109/50.59173.
Kazovsky et al., "Balanced Phase-Locked Loops for Optical Homodyne Receivers: Performance Analysis, Design Considerations, and Laser Linewidth Requirements", Journal of Lightwave Technology, vol. 4, No. 2, Feb. 1986, pp. 182-195, doi: 10.1109/JLT.1986.1074698.
Kessler et al., "A sub-40-mHz-linewidth laser based on a silicon single- crystal optical cavity", Nature Photonics, vol. 6, Oct. 2012, pp. 687-692, doi: 10.1038/nphoton.2012.217.
Kharel et al., "Ultra-high-Q phononic resonators on-chip at cryogenic temperatures", APL Photonics, vol. 3, No. 6, Jun. 2018, pp. 066101-1-066101-9, doi: 10.1063/1.5026798.

(56) References Cited

OTHER PUBLICATIONS

Kikuchi, “Fundamentals of Coherent Optical Fiber Communications”, Journal of Lightwave Technology, vol. 34, No. 1, Jan. 1, 2016, pp. 157-179, doi: 10.1109/JLT.2015.2463719.
Kippenberg et al., “Dissipative Kerr solitons in optical microresonators”, Science, vol. 361, No. 6402, Aug. 10, 2018, 11 pgs., doi: 10.1126/science.aan8083.
Kippenberg et al., “Microresonator-Based Optical Frequency Combs”, Science, vol. 332, No. 6029, Apr. 29, 2011, pp. 555-559, doi: 10.1126/science. 1193968.
Kirkendall et al., “Overview of high performance fibre-optic sensing”, Journal of Physics D: Applied Physics, vol. 37, No. 18, Sep. 1, 2004, pp. R197-R216, doi: 10.1088/0022-3727/37/18/R01.
Kitching, “Chip-scale atomic devices”, Applied Physics Reviews, vol. 5, No. 3, 2018, pp. 031302-1-031302-38, doi: 10.1063/1.5026238.
Kitching et al., “Atomic Sensors—A Review”, IEEE Sensors Journal, vol. 11, No. 9, Sep. 2011, pp. 1749-1758, doi: 10.1109/JSEN.2011.2157679.
Kohler et al., “Biophotonic sensors with integrated Si3N4-organic hybrid (SiNOH) lasers for point-of-care diagnostics”, Light: Science & Applications, vol. 10, No. 64, Mar. 26, 2021, 12 pgs., doi: 10.1038/s41377-021-00486-w.
Koizumi et al., “1024 QAM (60 Gbit/s) single-carrier coherent optical transmission over 150 km”, Optics Express, vol. 20, No. 11, May 17, 2012, pp. 12508-12514, doi: 10.1364/OE.20.012508.
Komljenovic et al., “Photonic Integrated Circuits Using Heterogeneous Integration on Silicon”, Proceedings of the IEEE, vol. 106, No. 12, Dec. 2018, pp. 2246-2257, doi: 10.1109/JPROC.2018.2864668.
Komljenovic et al., “Widely-Tunable Ring-Resonator Semiconductor Lasers”, Applied Sciences, vol. 7, No. 7, Article 732, Jul. 17, 2017, 21 pgs., doi: 10.3390/app7070732.
Koos et al., “Silicon-Organic Hybrid (SOH) and Plasmonic-Organic Hybrid (POH) Integration”, Journal of Lightwave Technology, vol. 34, No. 2, Jan. 15, 2016, pp. 256-268, doi: 10.1109/JLT.2015.2499763.
Kusano et al., “Effects of DC Bias Tuning on Air-Coupled PZT Piezoelectric Micromachined Ultrasonic Transducers”, Journal of Microelectromechanical Systems, vol. 27, No. 2, Apr. 2018, pp. 296-304, doi: 10.1109/JMEMS.2018.2797684.
Kwee et al., “Stabilized high-power laser system for the gravitational wave detector advanced LIGO”, Optics Express, vol. 20, No. 10, Apr. 24, 2012, pp. 10617-10634, doi: 10.1364/OE.20.010617.
Lacava et al., “Si-rich Silicon Nitride for Nonlinear Signal Processing Applications”, Scientific Reports, vol. 7, Article 22, Feb. 2, 2017, 13 pgs., doi: 10.1038/s41598-017-00062-6.
Laperle et al., “Advances in High-Speed DACs, ADCs, and DSP for Optical Coherent Transceivers”, Journal of Lightwave Technology, vol. 32, No. 4, Feb. 15, 2014, pp. 629-643, doi: 10.1109/JLT.2013.2284134.
Le Gouet et al., “Influence of lasers propagation delay on the sensitivity of atom interferometers”, The European Physical Journal D, vol. 44, Jun. 29, 2007, pp. 419-425, doi: 10.1140/epjd/e2007-00218-2.
Lee et al., “Spiral resonators for on-chip laser frequency stabilization”, Nature Communications, vol. 4, Article 2468, Sep. 17, 2013, 6 pgs., doi: 10.1038/ncomms3468.
Levine, “Introduction to time and frequency metrology”, Review of Scientific Instruments, vol. 70, No. 6, Jun. 1, 1999, pp. 2567-2596, doi: 10.1063/1.1149844.
Savchenkov et al., “Whispering-gallery-mode resonators as frequency references. II. Stabilization”, Journal of the Optical Society of America B, vol. 24, No. 12, Dec. 2007, pp. 2988-2997, doi: 10.1364/JOSAB.24.002988.
Schediwy et al., “Stabilized microwave-frequency transfer using optical phase sensing and actuation”, Optics Letters, vol. 42, No. 9, May 1, 2017, pp. 1648-1651, doi: 10.1364/OL.42.001648.
Schilt et al., “Frequency discriminators for the characterization of narrow-spectrum heterodyne beat signals: Application to the measurement of a sub-hertz carrier-envelope-offset beat in an optical frequency comb”, Review of Scientific Instruments, vol. 82, No. 12, Article 123116, Dec. 2011, pp. 123116-1-123116-11, doi: 10.1063/1.3670357.
Schioppo et al., “Comparing ultrastable lasers at 7×10−17 fractional frequency instability through a 2220 km optical fibre network”, Nature Communications, vol. 13, No. 212, Jan. 11, 2022, 11 pgs., doi: 10.1038/s41467-021-27884-3.
Schioppo et al., “Ultrastable optical clock with two cold-atom ensembles”, Nature Photonics, vol. 11, Jan. 2017, pp. 48-52, doi: 10.1038/nphoton.2016.231.
Schmidt et al., “Observation of optical coupling in microdisk resonators”, Physical Review A, vol. 80, No. 4, Article 043841, Oct. 30, 2009, pp. 043841-1-043841-9, doi: 10.1103/PhysRevA.80.043841.
Schow et al., “INTREPID: Developing Power Efficient Analog Coherent Interconnects to Transform Data Center Networks”, Optical Fiber Communications Conference and Exhibition (OFC), Mar. 3-7, 2019, 3 pgs., doi: 10.1364/OFC.2019.M4D.9.
Seimetz, “Laser Linewidth Limitations for Optical Systems with High-Order Modulation Employing Feed Forward Digital Carrier Phase Estimation”, Conference on Optical Fiber Communication/National Fiber Optic Engineers Conference, 2008, 3 pgs., doi: 10.1109/OFC.2008.4528637.
Shams-Ansari et al., “Reduced material loss in thin-film lithium niobate waveguides”, APL Photonics, vol. 7, No. 8, Article 081301, Aug. 3, 2022, pp. 081301-1-081301-7, doi: 10.1063/5.0095146.
Sharma et al., “Synthesis and Characterization of LPCVD Polysilicon and Silicon Nitride Thin Films for MEMS Applications”, Journal of Materials, vol. 2014, Article 954618, 2014, 8 pgs., doi: 10.1155/2014/954618.
Shi et al., “Suppression of residual amplitude modulation effects in Pound-Drever-Hall locking”, Applied Physics B, vol. 124, Article 153, Jul. 7, 2018, 7 pgs., doi: 10.1007/s00340-018-7021-y.
Siegle et al., “Photonic molecules with a tunable inter-cavity gap”, Light: Science & Applications, vol. 6, No. 3, e16224, Sep. 7, 2016, 7 pgs., doi: 10.1038/lsa.2016.224.
Simsek et al., “A Chip-Scale Heterodyne Optical Phase-Locked Loop with Low-Power Consumption”, Optical Fiber Communication Conference, paper W4G.3, 2017, 3 pgs., doi: 10.1364/OFC.2017.W4G.3.
Simsek et al., “Evolution of Chip-Scale Heterodyne Optical Phase-Locked Loops Toward Watt Level Power Consumption”, Journal of Lightwave Technology, vol. 36, No. 2, Jan. 15, 2018, pp. 258-264, doi: 10.1109/JLT.2017.2758744.
Sluyski et al., “Implementation Agreement 400ZR”, Implementation Agreement created and approved OIF, OIF-400ZR-01.0, Optical Internetworking Forum, Mar. 10, 2020, 100 pgs.
Smit et al., “An introduction to InP-based generic integration technology”, Semiconductor Science and Technology, vol. 29, No. 8, Article 083001, Jun. 13, 2014, 41 pgs., doi: 10.1088/0268-1242/29/8/083001.
Sorace-Agaskar et al., “Versatile Silicon Nitride and Alumina Integrated Photonic Platforms for the Ultraviolet to Short-Wave Infrared”, IEEE Journal of Selected Topics in Quantum Electronics, vol. 25, No. 5, Sep.-Oct. 2019, 17 pgs., doi: 10.1109/jstqe.2019.2904443.
Souza et al., “Spectral engineering with coupled microcavities: active control of resonant mode-splitting”, Optics Letters, vol. 40, No. 14, Jul. 15, 2015, pp. 3332-3335, doi: 10.1364/OL.40.003332.
Spencer et al., “An Integrated-Photonics Optical-Frequency Synthesizer”, arXiv:1708.05228v1 [physics.app-ph], Aug. 15, 2017, 10 pgs.
Spencer et al., “An optical-frequency synthesizer using integrated photonics”, Nature, vol. 557, Apr. 25, 2018, pp. 81-85, doi: 10.1038/s41586-018-0065-7.
Spencer et al., “Integrated waveguide coupled Si3N4 resonators in the ultrahigh-Q regime”, Optica, vol. 1, No. 3, Sep. 2014, pp. 153-157, doi: 10.1364/OPTICA.1.000153.
Stanfield et al., “CMOS-compatible, piezo-optomechanically tunable photonics for visible wavelengths and cryogenic temperatures”, Optics Express, vol. 27, No. 20, Sep. 30, 2019, pp. 28588-28605, doi: 10.1364/oe.27.028588.

(56) References Cited

OTHER PUBLICATIONS

Stern et al., "Battery-operated integrated frequency comb generator", Nature, vol. 562, Oct. 8, 2018, pp. 401-405, doi: 10.1038/s41586-018-0598-9.
Strekalov et al., "Nonlinear and quantum optics with whispering gallery resonators", Journal of Optics, vol. 18, No. 12, Nov. 16, 2016, 43 pgs., doi: 10.1088/2040-8978/18/12/123002.
Suematsu et al., "Optical Second-Harmonic Generation Due to Guided-Wave Structure Consisting of Quartz and Glass Film", IEEE Journal of Quantum Electronics, vol. 10, No. 2, Feb. 1974, pp. 222-229, doi: 10.1109/JQE.1974.1145777.
Tang et al., "Over 67 GHz bandwidth hybrid silicon electroabsorption modulator with asymmetric segmented electrode for 1.3 μm transmission", Optics Express, vol. 20, No. 10, May 4, 2012, pp. 11529-11535, doi: 10.1364/OE.20.011529.
Tao et al., "Demonstration of a compact wavelength tracker using a tunable silicon resonator", Optics Express, vol. 22, No. 20, Sep. 25, 2014, pp. 24104-24110, doi: 10.1364/OE.22.024104.
Taylor, "Coherent Detection Method Using DSP for Demodulation of Signal and Subsequent Equalization of Propagation Impairments", IEEE Photonics Technology Letters, vol. 16, No. 2, Feb. 2004, pp. 674-676, doi: 10.1109/LPT.2003.823106.
Thorpe et al., "Laser frequency stabilization and control through offset sideband locking to optical cavities", Optics Express, vol. 16, No. 20, Sep. 24, 2008, pp. 15980-15990, doi: 10.1364/oe.16.015980.
Tian et al., "Hybrid integrated photonics using bulk acoustic resonators", Nature Communications, vol. 11, Article 3073, Jun. 17, 2020, 8 pgs., doi: 10.1038/s41467-020-16812-6.
Toyoda et al., "The temperature dependence of the refractive indices of fused silica and crystal quartz", Journal of Physics D: Applied Physics, vol. 16, No. 5, 1983, pp. L97-L100, doi: 10.1088/0022-3727/16/5/002.
Tran et al., "Ring-Resonator Based Widely-Tunable Narrow-Linewidth Si/InP Integrated Lasers", IEEE Journal of Selected Topics in Quantum Electronics, vol. 26, No. 2, Article 1500514, Mar./Apr. 2020, 14 pgs., doi: 10.1109/jstqe.2019.2935274.
Tu et al., "Vertically coupled photonic molecule laser", Applied Physics Letters, vol. 100, No. 4, Article 041103, Jan. 23, 2012, pp. 041103-1-041103-4, doi: 10.1063/1.3678191.
Tzimpragos et al., "A Survey on FEC Codes for 100G and Beyond Optical Networks", IEEE Communications Surveys & Tutorials, vol. 18, No. 1, Jan. 1, 2016, pp. 209-221, doi: 10.1109/COMST.2014.2361754.
Vahala et al., "Semiclassical Theory of Noise in Semiconductor Lasers—Part I", IEEE Journal of Quantum Electronics, vol. 19, No. 6, Jun. 1983, pp. 1096-1101, doi: 10.1109/JQE.1983.1071986.
Vahala et al., "Semiclassical Theory of Noise in Semiconductor Lasers—Part II", IEEE Journal of Quantum Electronics, vol. 19, No. 6, Jun. 1983, pp. 1102-1109, doi: 10.1109/JQE.1983.1071984.
Verrinder et al., "Gallium Arsenide Photonic Integrated Circuit Platform for Tunable Laser Applications", IEEE Journal of Selected Topics in Quantum Electronics, vol. 28, No. 1, Article 6100109, Jan./Feb. 2022, 9 pgs., doi: 10.1109/jstqe.2021.3086074.
Wang et al., "A low-power PZT stress-optic Si3N4 micro-ring modulator for PDH locking applications", Conference on Lasers and Electro-Optics, paper STu5G.2, 2022, 2 pgs., doi: 10.1364/CLEO_SI.2022.STu5G.2.
Wang et al., "Fully symmetric controllable integrated three-resonator photonic molecule", arXiv:2105.10815v1 [physics.optics], May 22, 2021, 14 pgs.
Wang et al., "Independently Coupled and PZT Controllable Photonic Integrated Three Resonator Photonic Molecule", Conference on Lasers and Electro-Optics (CLEO), paper STu1F.7, 2021, 2 pgs., doi: 10.1364/CLEO_SI.2021.STu1F.7.
Wang et al., "Integrated photonic quantum technologies", Nature Photonics vol. 14, 2020, pp. 273-284, doi: 10.1038/s41566-019-0532-1.
Wang et al., "Low loss, low power, silicon nitride PZT stress-optic microresonator modulator for control functions", Frontiers in Optics / Laser Science, 2021, 2 pgs., doi: 10.1364/FIO.2021.FW6B.2.
Wang et al., "Nanophotonic lithium niobate electro-optic modulators", Optics Express, vol. 26, No. 2, Jan. 22, 2018, pp. 1547-1555, doi: 10.1364/OE.26.001547.
Wang et al., "Silicon nitride stress-optic microresonator modulator for optical control applications", Optics Express, vol. 30, No. 18, Aug. 29, 2022, pp. 31816-31827, doi: 10.1364/OE.467721.
Wang et al., "Ultra-low loss silicon nitride ring modulator with low power PZT actuation for photonic control", Optical Fiber Communication Conference (OFC), paper W3D.5, 2022, 3 pgs., doi: 10.1364/OFC.2022.W3D.5.
Wang et al., "Wave Propagation in Thin-Film Optical Waveguides Using Gyrotropic and Anisotropic Materials as Substrates", IEEE Journal of Quantum Electronics, vol. 8, No. 2, Feb. 1972, pp. 212-216, doi: 10.1109/JQE.1972.1076911.
Wanser, "Fundamental Phase Noise Limit in Optical Fibres Due to Temperature Fluctuations", Electronics Letters, vol. 28, No. 1, Jan. 2, 1992, pp. 53-54, doi: 10.1049/el:19920033.
Welch, "100 Gbps/lambda vs. 50 Gbps/lambda : Cost and Power Comparisons in Silicon Photonics", Luxtera, Retrieved from internet: <https://www.ieee802.org/3/bs/public/15_01/welch_3bs_02_0115.pdf>, Retrieved on Aug. 27, 2025, 21 pgs.
Weng et al., "Nano-Kelvin Thermometry and Temperature Control: Beyond the Thermal Noise Limit", Physical Review Letters, vol. 112, No. 160801, Apr. 21, 2014, pp. 160801-1-160801-5, doi: 10.1103/PhysRevLett.112.160801.
Williams et al., "High-stability transfer of an optical frequency over long fiber-optic links", Journal of the Optical Society of America B, vol. 25, No. 8, Aug. 2008, pp. 1284-1293, doi: 10.1364/JOSAB.25.001284.
Winzer, "Scaling Optical Fiber Networks: Challenges and Solutions", Optics and Photonics News, vol. 26, No. 3, Mar. 2015, pp. 28-35, doi: 10.1364/OPN.26.3.000028.
Wong et al., "Review—Progress in High Performance III-Nitride Micro-Light-Emitting Diodes", ECS Journal of Solid State Science and Technology, vol. 9, No. 1, Article 015012, Nov. 7, 2019, 8 pgs., doi: 10.1149/2.0302001JSS.
Wu et al., "0.26-Hz-linewidth ultrastable lasers at 1557 nm", Scientific Reports, vol. 6, Article 24969, Apr. 27, 2016, 5 pgs., doi: 10.1038/srep24969.
Wu et al., "Low-loss and high-Q Ta2O5 based micro-ring resonator with inverse taper structure", Optics Express, vol. 23, No. 20, Sep. 29, 2015, pp. 26268-26275, doi: 10.1364/OE.23.026268.
Wu et al., "Low-noise Kerr frequency comb generation with low temperature deuterated silicon nitride waveguides", Optics Express, vol. 29, No. 18, Aug. 30, 2021, pp. 29557-29566, doi: 10.1364/OE.438436.
Wu et al., "Tantalum pentoxide (Ta2O5) based athermal micro-ring resonator", OSA Continnum, vol. 2, No. 4, Apr. 15, 2019, pp. 1198-1206, doi: 10.1364/OSAC.2.001198.
Xiang et al., "High-Performance Silicon Photonics Using Heterogeneous Integration", IEEE Journal of Selected Topics in Quantum Electronics, vol. 28, No. 3, Article 8200515, May/Jun. 2022, 15 pgs., doi: 10.1109/jstqe.2021.3126124.
Xiao et al., "A highly compact third-order silicon microring add-drop filter with a very large free spectral range, a flat passband and a low delay dispersion", Optics Letters, vol. 15, No. 22, Oct. 24, 2007, pp. 14765-14771, doi: 10.1364/OE.15.014765.
Xie et al., "Soliton frequency comb generation in CMOS-compatible silicon nitride microresonators", Photonics Research, vol. 10, No. 5, May 2022, pp. 1290-1296, doi: 10.1364/PRJ.454816.
Xiong et al., "Low-Loss, Silicon Integrated, Aluminum Nitride Photonic Circuits and Their Use for Electro-Optic Signal Processing", Nano Letters, vol. 12, No. 7, Jun. 4, 2012, pp. 3562-3568, doi: 10.1021/nl3011885.
Xu et al., "Micrometre-scale silicon electro-optic modulator", Nature, vol. 435, No. 7040, May 19, 2005, pp. 325-327, doi: 10.1038/nature03569.
Xue et al., "Thermal tuning of Kerr frequency combs in silicon nitride microring resonators", Optics Express, vol. 24, No. 1, 2016, pp. 687-698, doi: 10.1364/OE.24.000687.

(56) References Cited

OTHER PUBLICATIONS

Yang et al., "All-Optical Analog to Electromagnetically Induced Transparency in Multiple Coupled Photonic Crystal Cavities", Physical Review Letters, vol. 102, No. 17, Article 173902, May 1, 2009, pp. 173902-1-173902-4, doi: 10.1103/physrevlett.102.173902.
Yang et al., "Analysis of a triple-cavity photonic molecule based on coupled-mode theory", Physical Review A, vol. 95, No. 3, Article 033847, Mar. 31, 2017, pp. 033847-1-033847-10, doi: 10.1103/PhysRevA.95.033847.
Yang et al., "Bridging ultrahigh-Q devices and photonic circuits", Nature Photonics, vol. 12, Mar. 19, 2018, pp. 297-302, doi: 10.1038/s41566-018-0132-5.
Yang et al., "Realization of controllable photonic molecule based on three ultrahigh-Q microtoroid cavities", Laser & Photonics Reviews, vol. 11, No. 2, Article 1600178, Mar. 2017, 8 pgs., doi: 10.1002/lpor.201600178.
Ye et al., "Applications of Optical Cavities in Modern Atomic, Molecular, and Optical Physics", Advances in Atomic, Molecular, and Optical Physics, Academic Press, vol. 49, 2003, pp. 1-83, doi: 10.1016/S1049-250X(03)80003-4.
Ye et al., "Foundry manufacturing of tight-confinement, dispersion-engineered, ultralow-loss silicon nitride photonic integrated circuits", Photonic Research, vol. 11, No. 4, Apr. 2023, pp. 558-568, doi: 10.1364/PRJ.486379.
Ye et al., "Low-loss high-Q silicon-rich silicon nitride microresonators for Kerr nonlinear optics", Optics letters, vol. 44, No. 13, Jul. 1, 2019, pp. 3326-3329, doi: 10.1364/OL.44.003326.
Ye et al., "Quantum State Engineering and Precision Metrology Using State-Insensitive Light Traps", Science, vol. 320, No. 5884, Jun. 27, 2008, pp. 1734-1738, doi: 10.1126/science.1148259.
Yi et al., "Phase Noise Effects on High Spectral Efficiency Coherent Optical OFDM Transmission", Journal of Lightwave Technology, vol. 26, No. 10, May 15, 2008, pp. 1309-1316, doi: 10.1109/JLT.2008.919368.
Young et al., "Half-minute-scale atomic coherence and high relative stability in a tweezer clock", Nature, vol. 588, No. 7838, Dec. 17, 2020, pp. 408-413, doi: 10.1038/s41586-020-3009-y.
Yu et al., "Trade-off between optical modulation amplitude and modulation bandwidth of silicon micro-ring modulators", Optics Express, vol. 22, No. 12, Jun. 12, 2014, pp. 15178-15189, doi: 10.1364/OE.22.015178.
Yuan et al., "Correlated self-heterodyne method for ultra-low-noise laser linewidth measurements", Optics Express, vol. 30, No. 14, Jul. 4, 2022, pp. 25147-25161, doi: 10.1364/OE.458109.
Zeng et al., "Stabilizing a laser frequency by the Pound-Drever-Hall technique with an acousto-optic modulator", Applied Optics, vol. 60, No. 5, Feb. 10, 2021, pp. 1159-1163, doi: 10.1364/AO.415011.
Zhang et al., "An integrated silicon photonic chip platform for continuous-variable quantum key distribution", Nature Photonics, vol. 13, Aug. 12, 2019, pp. 839-842, doi: 10.1038/s41566-019-0504-5.
Zhang et al., "Electronically programmable photonic molecule", Nature Photonics, vol. 13, No. 1, Jan. 2019, pp. 36-40, doi: 10.1038/s41566-018-0317-y.
Zhang et al., "Microrod Optical Frequency Reference in the Ambient Environment", Physical Review Applied, vol. 12, No. 024010, Aug. 6, 2019, pp. 024010-1-024010-7, doi: 10.1103/PhysRevApplied.12.024010.
Zhang et al., "Silicon photonic terabit/s network-on-chip for datacenter interconnection", Optical Fiber Technology, vol. 44, Aug. 2018, pp. 2-12, doi: 10.1016/j.yofte.2017.12.007.
Zhang et al., "Ultranarrow Linewidth Photonic-Atomic Laser", Laser & Photonics Reviews, vol. 14, No. 4, Article 1900293, 2020, 7 pgs., doi: 10.1002/lpor.201900293.
Zhao et al., "Integrated reference cavity with dual-mode optical thermometry for frequency correction", Optica, vol. 8, No. 11, Nov. 2021, pp. 1481-1487, doi: 10.1364/OPTICA.432194.
Zhao et al., "Laser Frequency Drift Stabilization using an Integrated Dual-Mode Locking Si3N4 Waveguide Reference Cavity", Conference on Lasers and Electro-Optics (CLEO), 2021, 2 pgs.
Zhao et al., "Low-loss D-shape Silicon Nitride Waveguides Using a Dielectric Lift-off Fabrication Process", Conference on Lasers and Electro-Optics OSA Technical Digest (Optica Publishing Group), 2020, 2 pgs., doi: 10.1364/CLEO_SI.2020.STh1J.3.
Zhao et al., "Low-loss low thermo-optic coefficient Ta2O5 on crystal quartz planar optical waveguides", APL Photonics, vol. 5, No. 11, Article 116103, Nov. 2020, pp. 116103-1-116103-8, doi: 10.1063/5.0024743.
Zhuo et al., "RAIL: A Case for Redundant Arrays of Inexpensive Links in Data Center Networks", NSDI'17: Proceedings of the 14th USENIX Conference on Networked Systems Design and Implementation, 2017, pp. 561-576.
Zietz et al., "Characterization and Manipulation of Carbon Precursor Species during Plasma Enhanced Chemical Vapor Deposition of Graphene", Nanomaterials, vol. 10, No. 11, Article 2235, 2020, 11 pgs., doi: 10.3390/nano10112235.

* cited by examiner

OSC
412
Δγ
-
408
410
50/50
404
406
ΔØ
402
404
50/50
RESONATOR
400

INTEGRATED HIGH-EXTINCTION RATIO UNBALANCED MACH ZEHNDER INTERFEROMETERS AND INTEGRATED MACH ZEHNDER INTERFEROMETERS INCORPORATING COIL RESONATORS

CROSS REFERENCE TO RELATED APPLICATIONS

The current application claims the benefit of and priority under 35 U.S.C. § 119(e) to U.S. Provisional Patent Application No. 63/476,586 entitled "Integrated High-Extinction Ratio Unbalanced Mach Zehnder Interferometers for Laser Frequency Noise Measurements" filed Dec. 21, 2022, the disclosure of which is incorporated herein by reference in its entirety for all purposes.

STATEMENT OF FEDERAL SUPPORT

This invention was made with government support under HR0011-22-2-0008 awarded by the Defense Advanced Research Projects Agency. The government has certain rights in the invention.

FIELD OF THE INVENTION

The present invention generally relates to photonic integrated circuits incorporating Mach Zehnder interferometers. In particular it relates to photonic integrated circuits incorporating Mach Zehnder interferometers that incorporate delay arms and/or coil resonators.

BACKGROUND

Optical frequency noise is a central parameter in the performance of many precision applications in modern precision science and technology, such as optical gyroscopes, optical atomic clocks, and/or gravitational wave detection, quantum sensors and computing, as well as modern optical communications and/or other optical systems, where accurate and sensitive measurement of optical frequency and phase is essential to the application performance beyond that determined by a simple linewidth value. Additionally, operation of these systems depends on the optical frequency noise offset from the carrier at specific frequencies or over defined frequency bands. Examples of devices that require careful characterization of frequency noise are ultra-low-noise stabilized lasers. Many precision applications and other applications specify the required optical frequency noise at key offset frequencies. Performance of these application can be optimized by controlling parameters according to specific frequency noise measurements.

Systems to measure optical frequency noise are critical to characterizing devices and systems and establishing desired operating conditions in precision optical applications. The unbalanced fiber optical delay line Mach Zehnder interferometers (MZI) is commonly used as optical frequency discriminators (OFD) in delayed self-homodyne or self-heterodyne laser noise measurements with balanced photodetection and correlated heterodyne techniques for an improved noise floor. Legacy solution for Mach-Zehnder interferometers used as optical frequency discriminators include bulk optic solutions.

SUMMARY OF THE INVENTION

In some embodiments, the techniques described herein relate to a photonic integrated circuit forming part of a Mach Zehnder interferometer. In an embodiment, the photonic integrated circuit including: a first waveguide with an optical input at a first port and including a waveguide delay arm; a second waveguide; a first coupler that optically couples the first waveguide to the second waveguide at a first position; and a second coupler that optically couples the first waveguide to the second waveguide at a second position, the second position different from the first position.

In another embodiment, the light received to the first port sequentially passes first through the first coupler, second through the waveguide delay arm, and third through the second coupler.

In yet another embodiment, the waveguide delay arm is around 2 meters long.

In still another embodiment, the waveguide delay arm is positioned between the first coupler and the second coupler along a beamline.

In another additional embodiment, a first output port of the first waveguide and a second output port of the second waveguide is connected to a photodetector such that an optical signal can be used for optical frequency discrimination.

In yet still another embodiment again, a first output port of the first waveguide and a second output port of the second waveguide is connected to a detector such that an optical signal can be used to generate a control input for a laser.

In yet another embodiment again, the first coupler has a gap of around 2 μm and a length of around 1.4 mm.

In still another embodiment again, a first output port of the first waveguide and a second output port of the second waveguide are used for laser stabilization.

In another additional embodiment again, a laser optical frequency is selected from a list consisting of Deep UV, UV, near UV, Visible, Near IR, Mid IR and IR wavelengths.

In yet still another embodiment again, the photonic integrated circuit is formed of a material, the material selected from a list consisting of silicon nitride, tantalum pentoxide, alumina nitride, and alumina oxide.

In several embodiments, the techniques described herein relate to a photonic integrated circuit forming part of a Mach Zehnder interferometer. In an embodiment, the photonic integrated circuit including: a resonator; a first waveguide including an optical input at a first port and a delay arm; a second waveguide, the second waveguide coupled to the resonator at a first position; a first coupler that optically couples the first waveguide to the second waveguide at a second position; and a second coupler that optically couples the first waveguide to the second waveguide at a third position; wherein the waveguide delay arm is positioned between the first coupler and the second coupler.

In a further embodiment, the optical properties of the delay arm can be configured by a tuning effect, the tuning effect selected from a list consisting of electro-optic tuning effect, stress-optic tuning effect, current-injection tuning effect, and thermo-optic tuning effect.

In a yet further embodiment, the waveguide resonator is a coil resonator.

In a still further embodiment, an output from an output port is connected to a photodetector such that an optical signal can be used for optical frequency discrimination.

In a further additional embodiment, an output from an output port is connected to a detector such that an optical signal can be used to generate a control input for a feedback loop to lock a laser.

In a yet still further embodiment, the first coupler has a gap of around 1 μm and a length of around 1.4 mm.

In a further embodiment again, a first output port of the first waveguide and a second output port of the second waveguide are used for laser stabilization.

In a yet further embodiment again, a laser optical frequency is selected from a list consisting of Deep UV, UV, near UV, Visible, Near IR, Mid IR and IR wavelengths.

In a still further embodiment again, the photonic integrated circuit is formed of a material, the material selected from a list consisting of silicon nitride, tantalum pentoxide, alumina nitride, and alumina oxide.

In many embodiments, the techniques described herein relate to a photonic integrated circuit forming part of a Mach Zehnder interferometer. In an embodiment, the photonic integrated circuit including: a first waveguide with an optical input at a first port and a delay arm; a second waveguide; a first coupler that optically couples the first waveguide to the second waveguide at a first position; a waveguide coil resonator; and a second coupler that optically couples the first waveguide to the second waveguide at a second position, the second position different from the first position.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
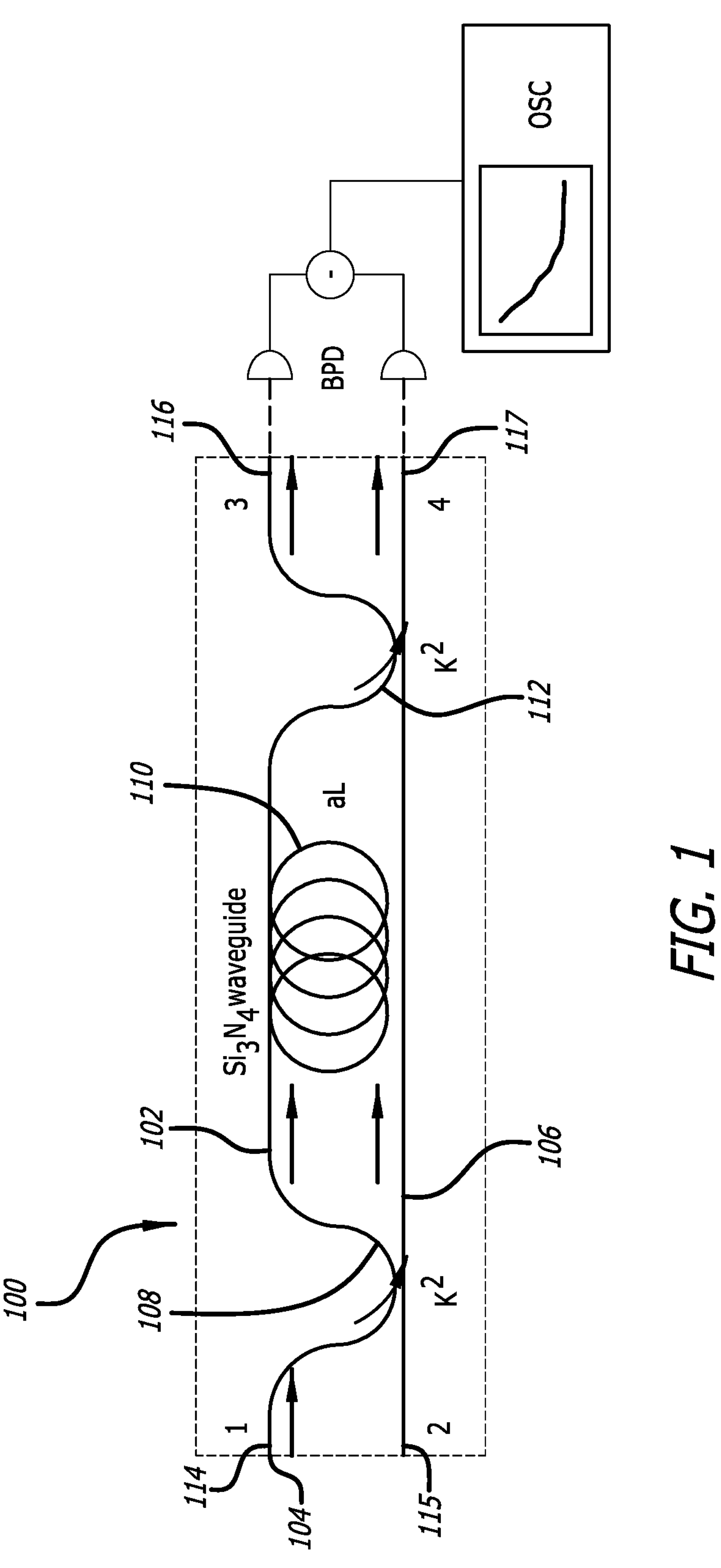
FIG. 1 conceptually illustrates an example Mach Zehnder interferometer (MZI) photonic integrated circuit with a long delay arm.

Optical frequency noise is a central parameter in the performance of many precision applications in modern precision science and technology, such as optical gyroscopes, optical atomic clocks, and/or gravitational wave detection, quantum sensors and computing, as well as modern optical communications and/or other optical systems, where accurate and sensitive measurement of optical frequency and phase is essential to the application performance beyond that determined by a simple linewidth value. Additionally, operation of these systems depends on the optical frequency noise offset from the carrier at specific frequencies or over defined frequency bands. Examples of devices that require careful characterization of frequency noise are ultra-low-noise stabilized lasers. Many precision applications and other applications specify the required optical frequency noise at key offset frequencies. Performance of these application can be optimized by controlling parameters according to specific frequency noise measurements.

An example of an optical system that is characterized by frequency noise is the ultra-low noise stabilized laser. Ultra-low-noise stable lasers can enable a wide range of applications in modern precision science and technology, such as optical gyroscopes, optical atomic clocks, and/or gravitational wave detection, as well as modern optical communications and/or other optical systems, where accurate and sensitive measurement of optical frequency and phase is essential to the application performance beyond that determined by a simple linewidth value. Unbalanced fiber optical delay line Mach Zehnder interferometers (MZI) are commonly used as optical frequency discriminators (OFD) in delayed self-homodyne or self-heterodyne laser noise measurements with balanced photo-detection and correlated heterodyne techniques for an improved noise floor. However, fiber-optic MZI-OFDs can be sensitive to environmental disturbances and noise measurements below 1 kHz are typically dominated by the fiber noise. This can make heterodyne beatnote detection with a reference laser necessary for close to carrier noise. Additionally, delay length and loss can be important parameters for frequency discrimination sensitivity, dynamic range, and/or extinction ratio (ER). Improved stability, reduced size, and/or reduced cost can be achieved with photonic integration and/or in-situ monitoring.

Often, in legacy systems noise measurements are made using optical frequency discriminator (OFD) fiber-optic delay-line interferometers and laser stabilization can be achieved by locking the laser to a table-top ultra-stable optical reference cavity used as an OFD. These techniques require the OFD to deliver a high frequency discrimination sensitivity and a low noise floor while the frequency discrimination properties are combined with Pound-Drever-Hall (PDH) feedback to narrow the integral linewidth.

A wide range of applications in modern precision science and technology (e.g., quantum sensing and computing, optical gyroscopes, optical atomic clocks, gravitational wave detection, precision metrology, and optical communications) require accurate and sensitive measurement of optical frequency, accurate and sensitive measurement of phase noise and stability, where the application performance can be determined by the simple linewidth value. Other applications, including high capacity fiber optic communications, can also be enabled by such measurement techniques in several embodiments.

Unbalanced fiber optical delay line Mach Zehnder interferometers (MZI) can be used as optical frequency discriminators (OFD) to make laser frequency/phase noise measurements. However, fiber-optic MZI-OFDs are often large, space consuming, expensive, sensitive to environmental disturbances, and sensitive to noise measurements. For MZI-OFDs, the delay length and loss of the unbalanced interferometer arm can be important parameters.

Fiber unbalanced Mach Zehnder interferometers (uMZI) with a long fiber delay line and balanced photo-detection can be used for noise measurements. Additionally, PDH laser stabilization can require sideband modulation and LO demodulation to avoid photodetector DC noise and the AM-FM noise conversion, which results in unwanted residual amplitude noise.

Integrated High-Extinction Ratio Unbalanced Mach Zehnder Interferometers for Laser Frequency Noise Measurements In accordance with embodiments of the invention, a waveguide integrated MZI-OFD with an asymmetric delay arm can be fabricated in an ultra-low loss integration platform (e.g., a silicon nitride platform). The benefits of an ultra-low loss integration platform can include maintaining the desirable properties of the MZI (e.g., extinction ratio) as the length of the arm is modified over a wide range of lengths. An ultra-low loss waveguide integrated MZI-OFD can realize on-chip laser frequency and/or phase noise measurements and/or on-chip laser frequency noise reduction with feedback loops in many embodiments. This system can be used for photonic integration of low-noise optical components and/or their performance monitoring systems, in-situ laser performance monitoring, and/or reduction in size, weight and/or cost of such measurement techniques. A waveguide integrated MZI-OFD with an asymmetric delay arm can be fabricated in an ultra-low loss integration platform can be an integrated frequency noise measurement device.

Integration of frequency noise measurement devices into photonic integrated circuits can reduce the power, cost, size, and weight of the frequency noise measurement devices. In various embodiments integration of frequency noise measurement devices can improve the manufacturability of such devices and improve their suitability for use in commercial applications for mobile, space based, and/or higher volume applications. Integrated frequency noise measurement devices can be used in new applications, including quantum, to establish a target optical frequency noise in a system that can be used to measure and set using feedback loops or other technique. Such integrated frequency noise measurement devices can also provide benefits from integration and new opportunities in quantum, atom and/or other application spaces.

In accordance with embodiments of the invention, frequency noise measurement devices can be integrated with lasers and/or photonic integrated circuits. Some embodiments include an around 2.0-meter-long ultra-low loss $Si_3N_4$ waveguide unbalanced MZI with an around 96.6 MHz FSR and a around 37.5 dB extinction ratio (ER). In various embodiments, frequency noise measurement devices can perform self-delayed homodyne laser frequency noise measurements.

Some embodiments can include MZI photonic integrated circuits (PIC). An example MZI PIC is conceptually illustrated in FIG. 1. An MZI PIC 100 can include a waveguide 102 (e.g., an optical waveguide). The waveguide 102 can be connected to an optical input 104 (e.g., a laser). The waveguide 102 can be coupled to a second waveguide 106 by a coupler (e.g., an optical waveguide splitter) 108. In several embodiments, an optical waveguide splitter can provide nominally 50% of the light to an upper arm and nominally 50% of the light to a lower arm. The first waveguide 102 can correspond to an upper arm. The second waveguide 106 can correspond to a lower arm. The first waveguide 102 can include a waveguide delay 110. Waveguide and or arms including waveguide delays (e.g., the first waveguide 102) can be referred to as delay arms. The waveguide 102 can include a second coupler 112 after the waveguide delay 110. The second coupler can be an optical waveguide splitter that can nominally provide 50% of the light to each of the coupled waveguides. The first waveguide 102 can have a first port 114 and a third port 116. The second waveguide 106 can have a second port 115 and a fourth port 117. A photodetector can be coupled to the third and fourth ports 116, 117, allowing measurements suitable for OFD. The MZI PIC 100 can be suitable for the outputs of the third and fourth ports 116, 117 to be used for stabilizing a laser. In accordance with embodiments of the invention, a waveguide delay can be a waveguide ring, a waveguide spiral, a waveguide serpentine and/or another structure that can be used to incorporate a waveguide delay arm onto a chip. In several embodiments, the delay can be lengthened by using stacked optical waveguide chips. Stacked optical waveguide chips can connect light in a first waveguide arm on a first chip to a second waveguide are on a second chip. Stacked optical waveguide chips can allow sharing light between chips, use an off-chip fiber delay line, and/or any combination of delay techniques. In several of the following plots, S13 can refer to a beamline from the first port 114 to the third port 116 and S24 can refer to a beamline from the second port 115 to the fourth port 117.

Figures 2A, 2B:
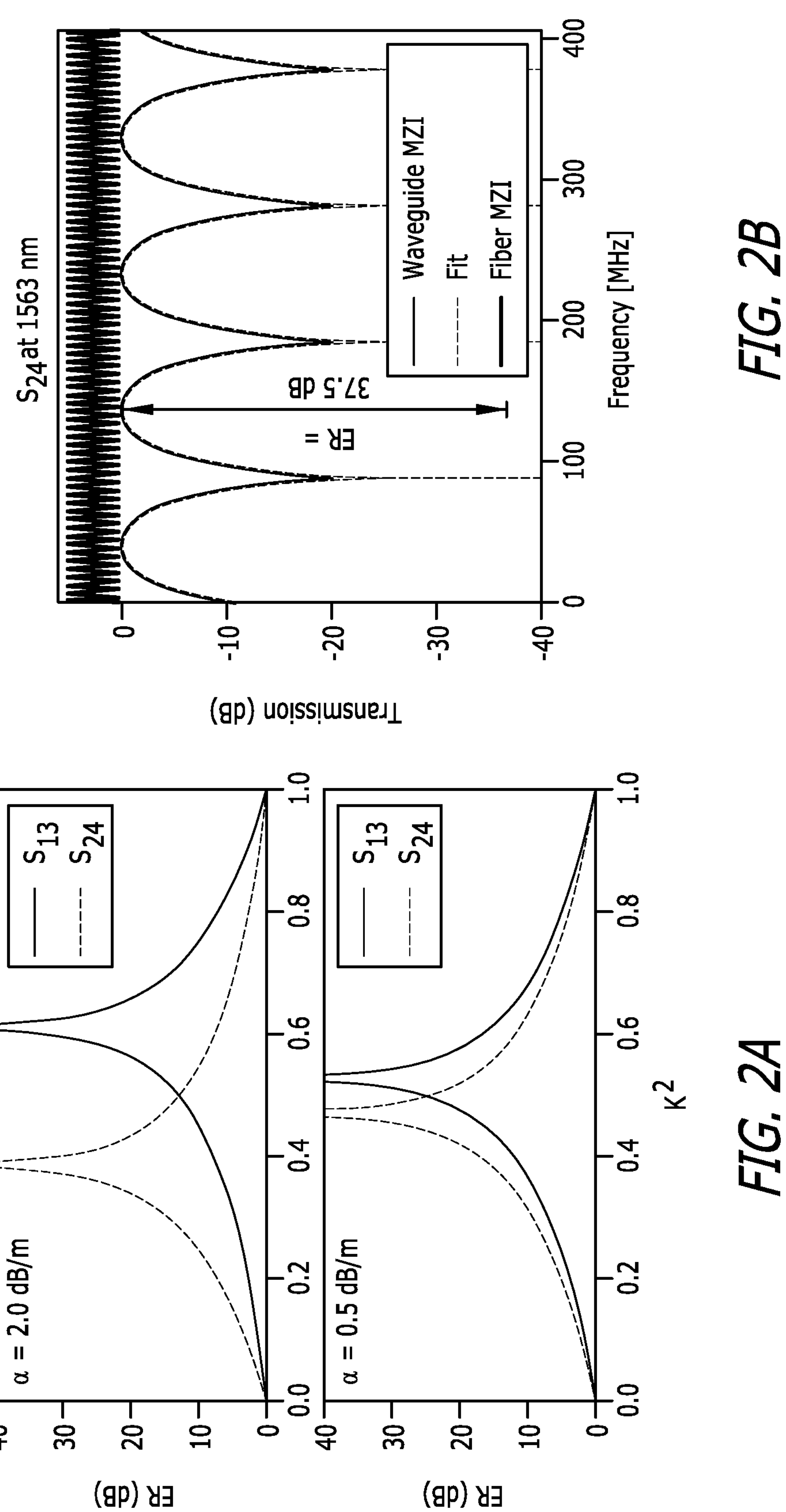
FIGS. 2A through 2E depict example data obtained from an example Mach Zehnder interferometer photonic integrated circuit with a long delay arm.
Figures 2C, 2D, 2E:
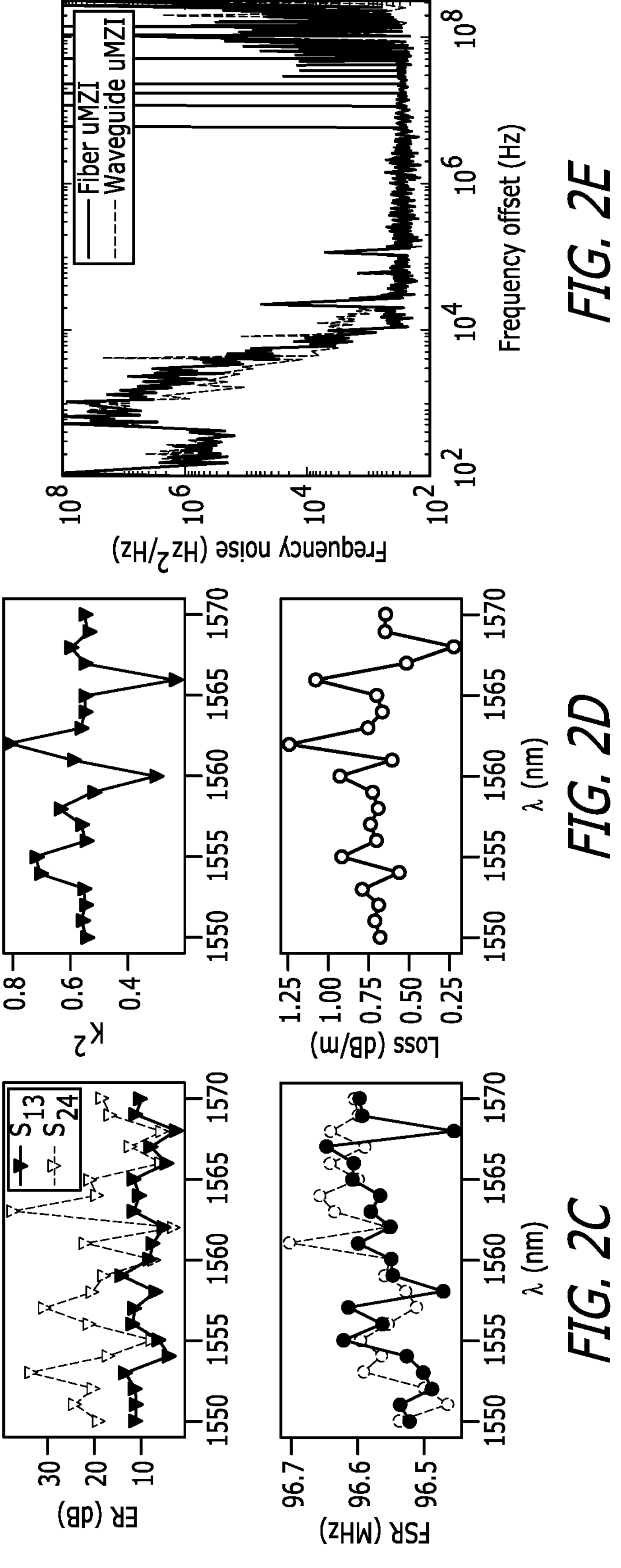

Two plots of ER versus directional coupler's coupling coefficient $\kappa^2$ with different propagation losses for a delay length L=2.0 m are depicted in FIG. 2A. A plot of frequency sweep of the MZI though $S_{24}$ at 1563 nm that shows a 37.5 dB ER is depicted in FIG. 2C.

In several embodiments, a waveguide integrated MZI-OFD can have a 2.0-meter-long delay arm, a 96.6 MHz free spectral range (FSR), a 37.5 dB extinction ratio (ER), and/or a 20 mm by 6 mm footprint. Integrated MZI-OFDs can be used to perform laser frequency measurements of a free-running external cavity laser with performance around that of a fiber MZI-OFD measurement. Many embodiments can perform on-chip laser frequency, phase noise measurements and/or on-chip laser frequency noise reduction with feedback loops. Numerous embodiments can include photonic integration of low-noise optical components and/or their performance monitoring systems such as those discussed herein.

A low noise floor in MZI-OFDs, can be improved, in several embodiments, with a lengthened delay arm length (L) and/or with a reduced propagation loss (a). In accordance with numerous embodiments of the invention, the free spectral range (FSR) can be lowered to below 100 MHz and/or measurements can have a high signal-to-noise ratio (SNR). Some embodiments can include a 200-meter-long fiber MZI-OFD. An MZI-OFD (e.g., a 200-meter MZI-OFD) can have a 1 MHz FSR with very low optical loss.

In accordance with embodiments of the invention, a small foot-print waveguide MZI for a low-noise-floor OFD can include small bending radii and low waveguide loss for the long delay arm. Higher waveguide confinement can result in a smaller bending radius without introducing bending loss and thus permitting a longer delay arm (L). Higher waveguide confinement can, in some embodiments, increase waveguide scattering loss ($\alpha$). An MZI FSR can be expressed as $v_{FSR}=c/n_g L$ and a corresponding S-matrix can be expressed as follows:

$$U = \begin{bmatrix} \tau^2 - \kappa^2 A e^{i\theta} & i\kappa\tau(1 + Ae^{i\theta}) \\ i\kappa\tau(1 + Ae^{i\theta} & \tau^2 A e^{i\theta} - \kappa^2 \end{bmatrix},$$

$$S_{13} = |U_{11}|^2, S_{24} = |U_{22}|^2,$$

where $A^2=e^{-aL}$ is the delay arm attenuation and $\kappa^2$ ($\kappa^2+\tau^2=1$) is the power coupling of the MZI coupler. From the S matrix, the ER as defined by the transmission maximum divided its minimum can be calculated for $S_{13}$ and $S_{24}$ for different values of $\kappa^2$ and $A^2$ for L=2.0 m (an example of which is depicted in FIG. 2A). demonstrating that to achieve ER above 20 dB for both $S_{13}$ and $S_{24}$ a coupling coefficient around 0.5 and loss below 0.5 dB/m can be required. In various embodiments, a coupling coefficient can be around 0.5 and/or a loss can be below around 0.5 dB/m. In several embodiments, a waveguide MZI can have a loss below 0.5 dB/m. A waveguide MZI can include an $Si_3N_4$ waveguide, and can be around 6 μm wide and around 80 nm thick. In accordance with several embodiments of the invention, an MZI waveguide can have a $\kappa^2$ around 0.5. Many embodiments include directional couplers with around 2 μm gap and/or around 1.4 mm coupling length.

Numerous embodiments can include a widely tunable laser (e.g., Velocity™ TLB-6700) to probe a waveguide MZI. A laser can sweep the frequency response of both $S_{13}$ and $S_{24}$ with a fiber MZI whose FSR is calibrated to be around 5.87 MHZ (e.g., with the corresponding delay length around 34 meters). An example frequency sweep of $S_{24}$ at 1563 nm with the max ER of 37.5 dB is depicted in FIG. 2B. Based on a frequency sweep an ER can be determined. FIG. 2A depicts an example, the example showing $S_{13}$ has an average ER of around 10 dB and $S_{24}$ has an average ER of around 20 dB.

A plot of example measurements of ER and FSR of an MZI from 1550 nm to 1570 nm is illustrated in FIG. 2C. Plots of example extracted $\kappa^2$ and a values from the ER of $S_{13}$ and $S_{24}$ are illustrated in FIG. 2D. Plots of example MZI-OFD laser noise measurements using both fiber MZI and waveguide MZI showing almost identical noise traces are illustrated in FIG. 2E.

In accordance with various embodiments, using an S-matrix model (e.g., as described elsewhere herein), a $\kappa^2$ and/or $A^2$ can be determined based on an ER (e.g., an ER of $S_{13}$ and/or $S_{24}$) An example plot based on this determination is illustrated FIG. 2D. In some embodiments, a waveguide MZI can yield a mean value of around 0.55 for $\kappa^2$ and/or around 0.73 dB/m for $\alpha$.

In accordance with numerous embodiments of the invention, a waveguide MZI can be used as an OFD. A tunable laser's frequency noise can be measured with a photodetector (e.g., Thorlabs™ PDB470C photodetector). Non-balanced detection can be used when only one MZI output port is coupled to a fiber. In some embodiments, a comparison with a waveguide MZI can be based on a fiber MZI (e.g., a fiber MZI 5.87 MHz FSR) for the same measurements with balanced detection. An example of such a comparison is shown in FIG. 2E. In various embodiments, the comparison described above results in almost identical noise measurements. Waveguide MZIs in accordance with many embodiments can have a performance around equivalent to a fiber MZI 5.87 MHz FSR. In several embodiment, a waveguide MZI OFD can have discrimination slopes with a 1 V peak-to-peak voltage around 65 mV/MHz. As a comparison, a fiber MZI can discrimination slopes with a 1 V peak-to-peak voltage around 1070 mV/MHz.

In many embodiments, a waveguide integrated MZI can have an around 2.0-meter-long delay arm, an around 96.6 MHz FSR, up to around 37.5 dB ER, and/or a footprint of around 20 mm by around 6 mm. Some embodiments of a waveguide integrated MZI can provide an around identical noise trace to a fiber MZI-OFD measurement.

Figure 3:
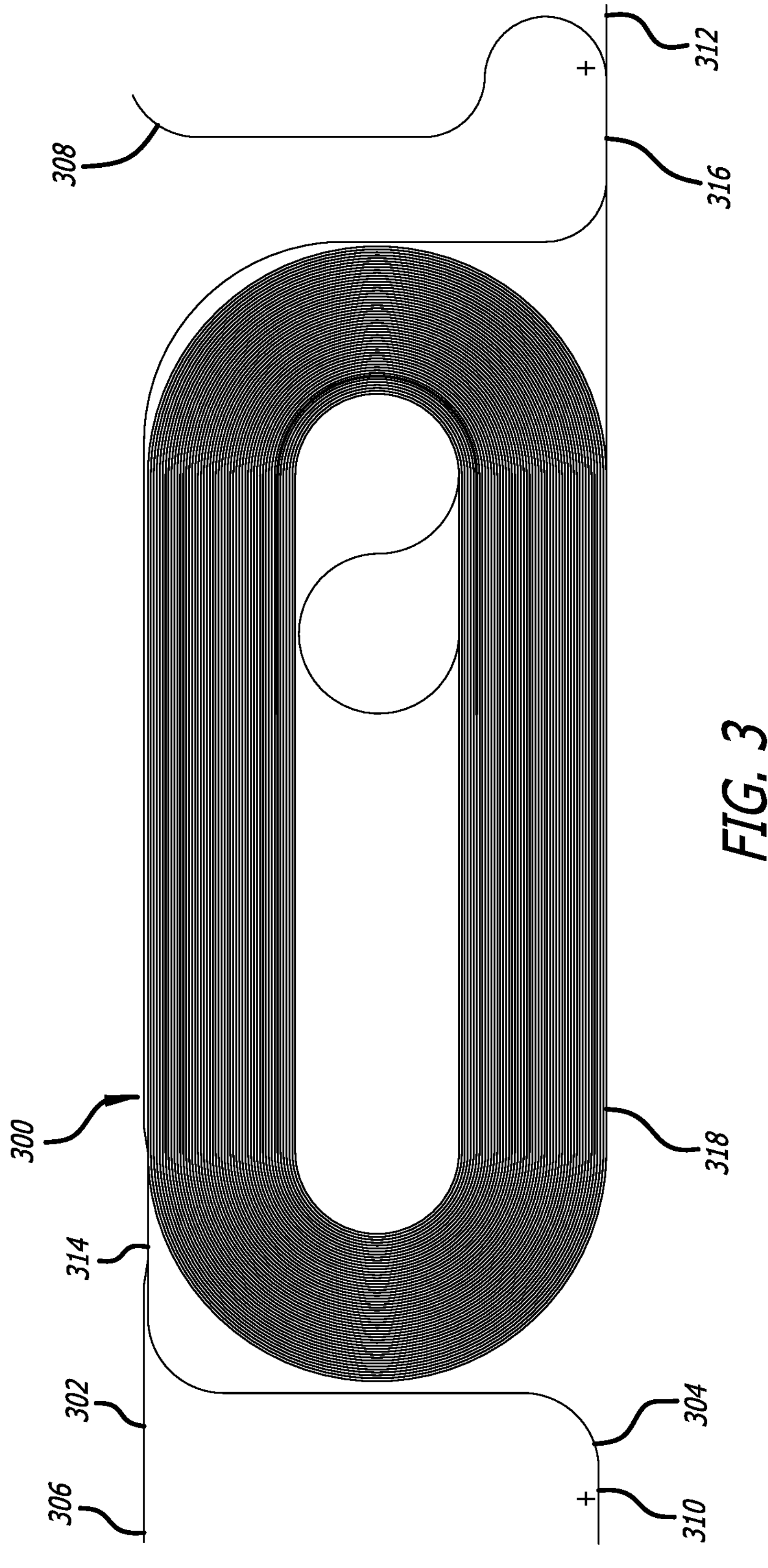
FIG. 3 conceptually illustrates an example integrated high-extinction ratio unbalanced Mach Zehnder interferometer.

An example integrated high-extinction ratio unbalanced Mach Zehnder interferometer is conceptually illustrated in FIG. 3. An unbalanced Mach Zehnder interferometer 300 can include a first waveguide 302 and a second waveguide 304. The first waveguide 302 can have a first port 306 and a second port 308. The second waveguide 304 can have a third port 310 and a fourth port 312. The first waveguide 302 can be coupled to the second waveguide 304 by a first coupler 314. The second waveguide 304 can incorporate a delay structure 318. In many embodiments, the delay structure can be around 2 meters long and/or can have an FSR of around 99.3 MHz. The delay structure 318 can be positioned between the first coupler 314 and the second coupler 316. The second coupler can couple the first waveguide 302 to the second waveguide 304. In many embodiments the couplers can have a length around 1.4 mm and/or a gap spacing of around 2.0 μm. In accordance with many embodiments, couplers can be formed by two waveguides positioned close together. In many embodiments, waveguides can have dimensions of around 6 μm by 80 nm. Couplers, in accordance with many embodiments, can be TE mode MZI directional couplers. Couplers can have around $\kappa^2$=0.48. The unbalanced Mach Zehnder interferometer described in connection with FIG. 3 can be suitable for OFD applications and/or laser stabilization and linewidth narrowing applications. In accordance with embodiments of the invention, light can be received into a first port. The light received to the first port can be coupled from a first waveguide to a second waveguide. After coupling, the light can pass through the delay arm before entering the second coupler. In accordance with many embodiments light can sequentially travel first through a first coupler, second through a delay arm, a third through a second coupler.

In many embodiments, a first output port of the first waveguide and a second output port of the second waveguide can be connected to a photodetector such that an optical signal can be used for optical frequency discrimination, laser stabilization and/or laser linewidth narrowing.

While specific methods and/or systems for integrated unbalanced Mach Zehnder interferometers are described above, any of a variety of methods and/or systems can be utilized as an integrated unbalanced Mach Zehnder interferometer as appropriate to the requirements of specific applications. In certain embodiments, steps and/or components may be performed and/or configured in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to an integrated unbalanced Mach Zehnder interferometer, the techniques disclosed herein may be used in any type of integrated optical system. The techniques disclosed herein may be used within any of the integrated optical systems, laser stabilization systems, linewidth narrowing systems, optical frequency discriminator systems, and/or other components and/or systems as described herein.

Integrated Self-Delayed Coil-Resonator for High Sensitivity Optical Frequency Discrimination and Laser Linewidth Narrowing In accordance with embodiments of the invention, an integrated self-delayed 2.0 m coil resonator can have a 61 million intrinsic Q for high-sensitivity optical frequency discrimination and/or can have semiconductor laser stabilization with 4 orders magnitude frequency noise reduction and/or 212 Hz integral linewidth.

Photonic integrated circuits are desirable to reduce the size, weight, and cost, and to achieve reduced environmental noise sensitivity for stabilized lasers and noise measurement. Approaches that deliver high-sensitivity OFD and PDH-error-like response without modulation/demodulation and residual amplitude noise are important approaches. A bulk-optic approach utilizes interference of an optical cavity response and delayed laser light with balanced photo-detection to realize frequency discrimination without sideband modulation and demodulation and has also been demonstrated using an integrated programmable photonic circuit.

Several embodiments include an integrated high-sensitivity, low-noise optical frequency discriminator (OFD) that also serves as a reference cavity for laser linewidth narrowing. Such an OFD based on a self-delayed 2.0 m coil resonator fabricated in an ultra-low-loss Si3N4 platform. Self-delayed coil resonators can have an around 61 million intrinsic Q, around a 96.9 MHZ FSR, and/or frequency noise discrimination sensitivity of around 0.51 V/MHz. Using such a cavity, some embodiments can achieve over 4 orders of magnitude frequency noise reduction of a free running semiconduction laser and 212 Hz integral linewidth representing an around 17× integral linewidth reduction over the free running laser. Several embodiments using such an approach offer the advantage of a PDH-error-signal-like response with high-sensitivity and AM-to-FM-conversion-free frequency discrimination without modulation and the resulting residual amplitude noise.

Figure 4:
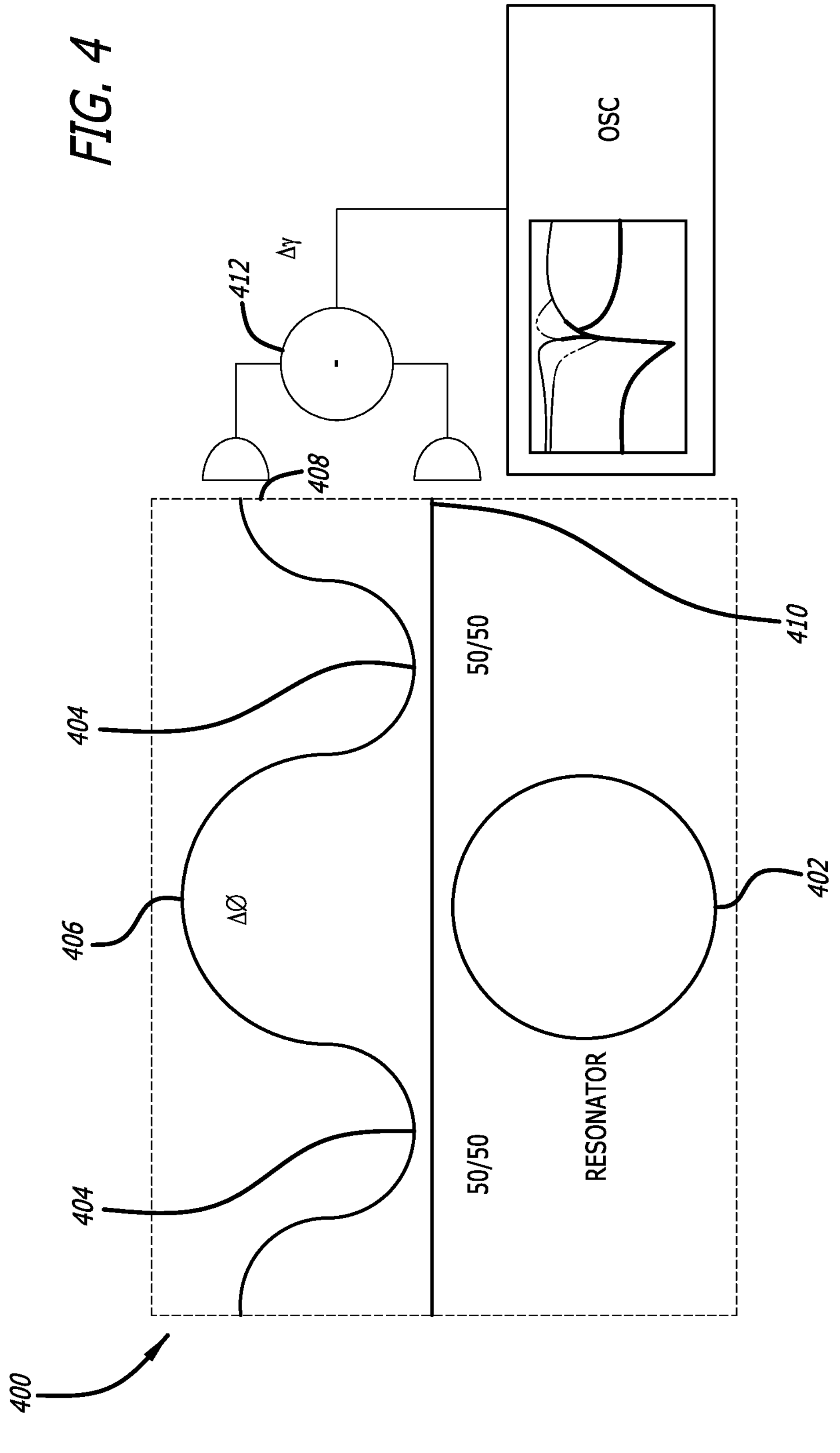
FIG. 4 conceptually illustrates an example integrated self-delayed coil-resonator for high sensitivity optical frequency discrimination.

An example integrated self-delayed coil-resonator for high sensitivity optical frequency discrimination and laser linewidth narrowing is conceptually illustrated in FIG. 4. A self-delayed coil resonator 400 can include a waveguide coil resonator 402. In many embodiments, waveguide coil resonators can be 2-meter-long. The waveguide coil resonator 402 can be coupled to a waveguide Mach Zehnder interferometer (MZI). The waveguide MZI can include two directional couplers (e.g., 50/50 directional couplers) 404 and a waveguide phase delay section 406. A first port 408 and a second port 410 can be connected to a photodetector 412. The waveguide delay section 406 can be positioned between a first and second of the directional couplers. In many embodiments, a waveguide can be 6 μm by 80 nm for a $TE_0$ mode to have a waveguide loss below 0.5 dB/m. The waveguide can have a critical bending radius below 1 mm using an ultra-low-loss silicon nitride fabrication process. The unbalancing delay length (e.g., as corresponding to a waveguide delay section), in many embodiments, can be around ΔL=2.2 mm, corresponding to a uMZI FSR of 0.72 nm. Directional couplers can have coupling power of around $\kappa^2$=50% with a 2.0 μm gap and/or 1.4 mm coupling length.

In accordance with several embodiments, a laser optical frequency is selected from Deep UV, UV, near UV, Visible, Near IR, Mid IR and IR wavelengths. In many embodiments, photonic integrated circuits can be formed of a material such as silicon nitride, tantalum pentoxide, alumina nitride, and alumina oxide.

Delay arms, waveguides, and/or resonators, in many embodiments can be configured to control optical properties. Configuration of such components can be achieved using tuning effects. Tuning effects can be electro-optic tuning effect, stress-optic tuning effect, current-injection tuning effect, and thermo-optic tuning effect.

Figure 5:
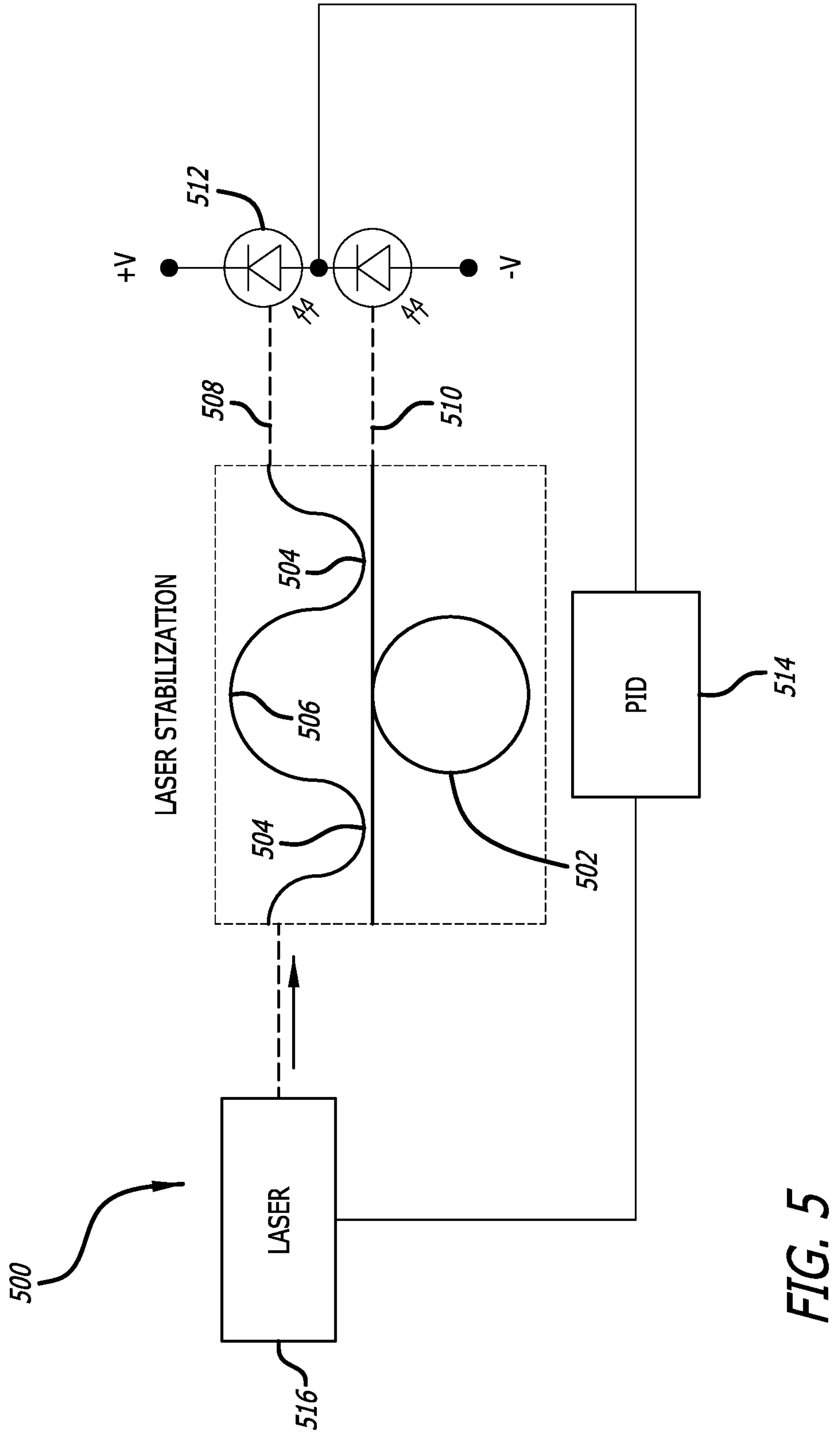
FIG. 5 conceptually illustrates an example integrated self-delayed coil-resonator for laser linewidth narrowing.

An example integrated self-delayed coil-resonator for laser linewidth narrowing is conceptually illustrated in FIG. 5. A self-delayed coil resonator laser stabilization system 500 can include a waveguide coil resonator 502. In many embodiments, waveguide coil resonators can be 2-meter-long. The waveguide coil resonator 502 can be coupled to a waveguide Mach Zehnder interferometer (MZI). The waveguide MZI can include two directional couplers (e.g., 50/50 directional couplers) 504 and a waveguide phase delay section 506. A first port 508 and a second port 510 can be connected to a detector 512. The detector 512 can be connected to a proportional-integral-derivative (PID) controller 514. The PID controller 514 can be connected to a laser 516. The laser 516 connected as an input to the waveguide MZI. The waveguide delay section 506 can be positioned between a first and second of the directional couplers.

Figure 6B:
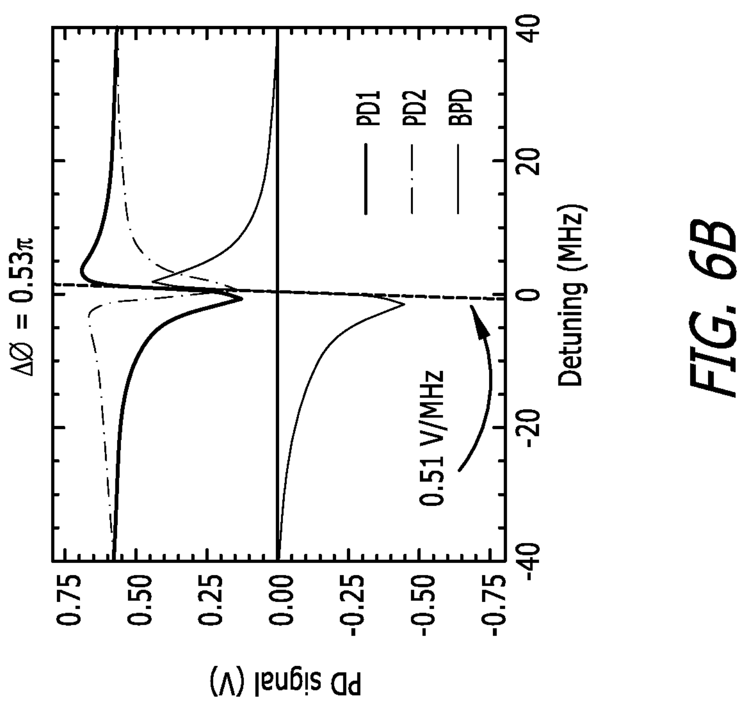
FIGS. 6A through 6B conceptually illustrate example data obtained from an example MZI with integrated self-delayed coil-resonator.
Figure 6A:
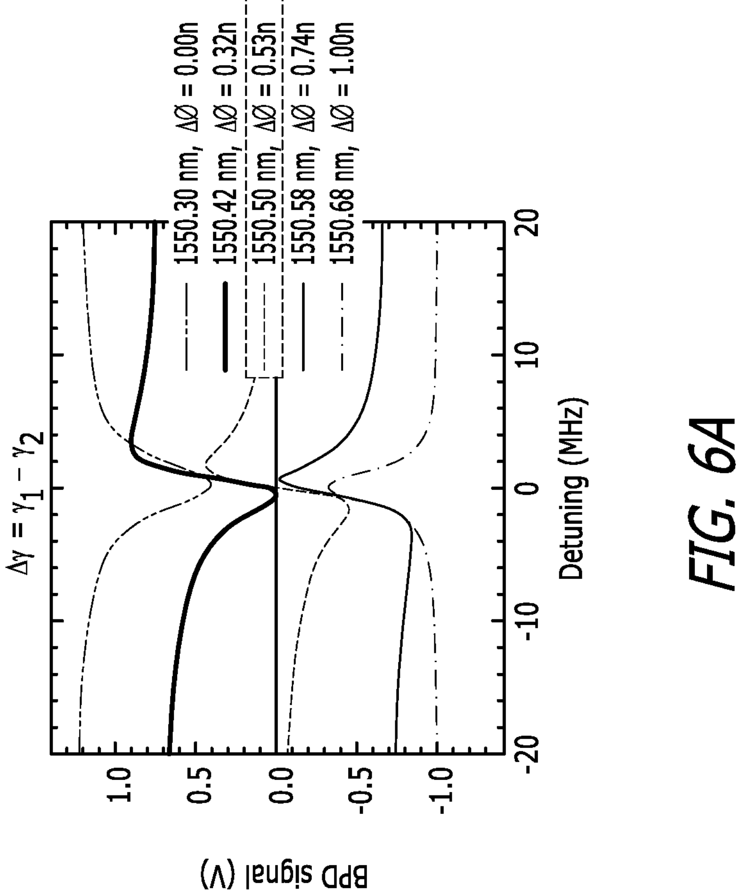

An example spectral scanning balanced detection output from an MZI with integrated self-delayed coil-resonator at different wavelengths and phases is conceptually illustrated in FIG. 6A. An example spectral scan response from both ports of a MZI with integrated self-delayed coil-resonator at 1550.50 nm and Δϕ=0.53π is conceptually illustrated in FIG. 6B.

The example spectral scan responses shown in FIG. 6A-B can be generated using a widely tunable laser (e.g., Velocity™ TLB-6700) for spectral scanning, a balanced photodetector (e.g., Thorlabs PDB470C), and/or a fiber uMZI with around a 5.87 MHz FSR for calibration of the spectral scanning.

In several embodiments, at 1550.30 nm and Δϕ=0, the loaded and intrinsic Qs of a coil resonator can be around 40 million and around 61 million respectively (e.g., as shown in FIG. 6A). In some embodiments, when the laser wavelength is changed from 1550.30 nm to 1550.68 nm, the uMZI phase section delay can changes from 0 to π, indicating the uMZI FSR is around 0.76 nm. At 1550.50 nm and Δϕ=0.53π, the two outputs are symmetric to each other and the balanced detection of the two yields a PDH-error-signal-like response with a zero-DC quadrature point (e.g., as shown in FIG. 6B), where the frequency discrimination slope is measured to be 0.51 V/MHz in accordance with embodiments of the invention.

Figures 7A, 7B:
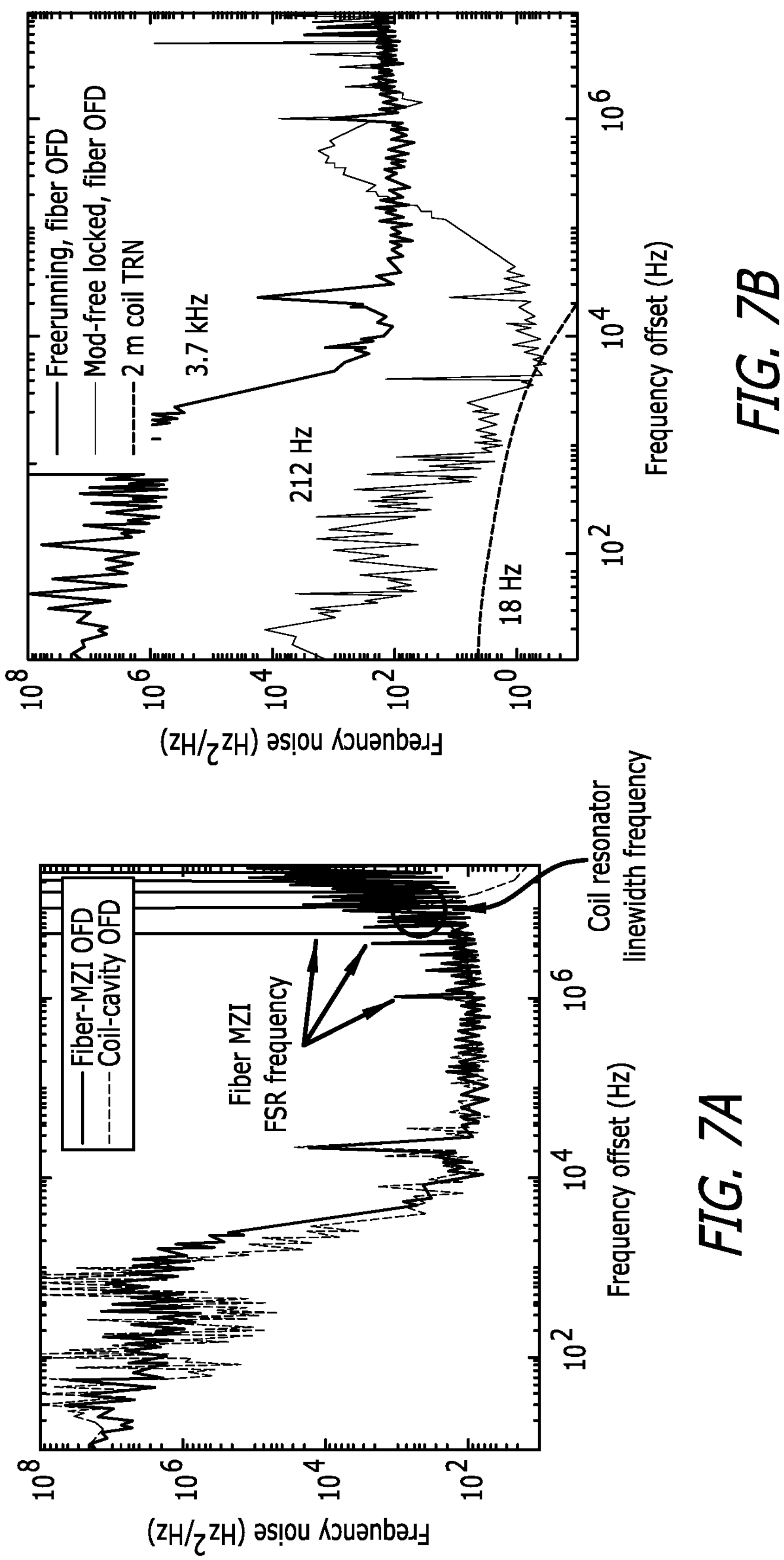
FIGS. 7A through 7B conceptually illustrate example laser noise measurements and laser stabilization data, the data suitable for comparing modulation-free cavity OFD to fiber uMZI OFD.

An example of laser noise measurements using modulation-free cavity OFD compared to fiber uMZI OFD is conceptually illustrated in FIG. 7A. An example of laser stabilization data from using a modulation-free self-delayed coil resonator is conceptually illustrated in FIG. 7B. An integrated circuit OFD, in accordance with many embodiments, can be compared to a 1-MHz-FSR fiber uMZI OFD. This comparison can include first measuring a free running laser (e.g., Velocity™ TLB-6700) and locking the free running laser to the self-delayed coil resonator OFD, without modulation, using direct feedback and balanced detection. In several embodiments, an integrated circuit cavity OFD and/or laser stabilization can provide over 4 orders of magnitude noise reduction and integral linewidth narrowing to 212 Hz, representing a 17× reduction from the free-running laser linewidth of around 3.7 kHz.

In numerous embodiments, an integrated high-sensitivity and low-noise on-chip OFD and frequency reference can include a self-delayed coil resonator. The self-delayed coil resonator can around 2 meters in length. The self-delayed coil resonator can be fabricated in the ultra-low-loss $Si_3N_4$ platform. In several embodiments a integrated coil resonator OFD can have a 61 million intrinsic Q, 96.9 MHz FSR and/or 0.51 V/MHz OFD slope.

In several embodiment, modulation free linewidth narrowing can reduce frequency noise by around 4 orders of magnitude and/or can reduce an integral linewidth to around 212 Hz (e.g., a factor of around 17× improvement over a free running linewidth).

Figure 8:
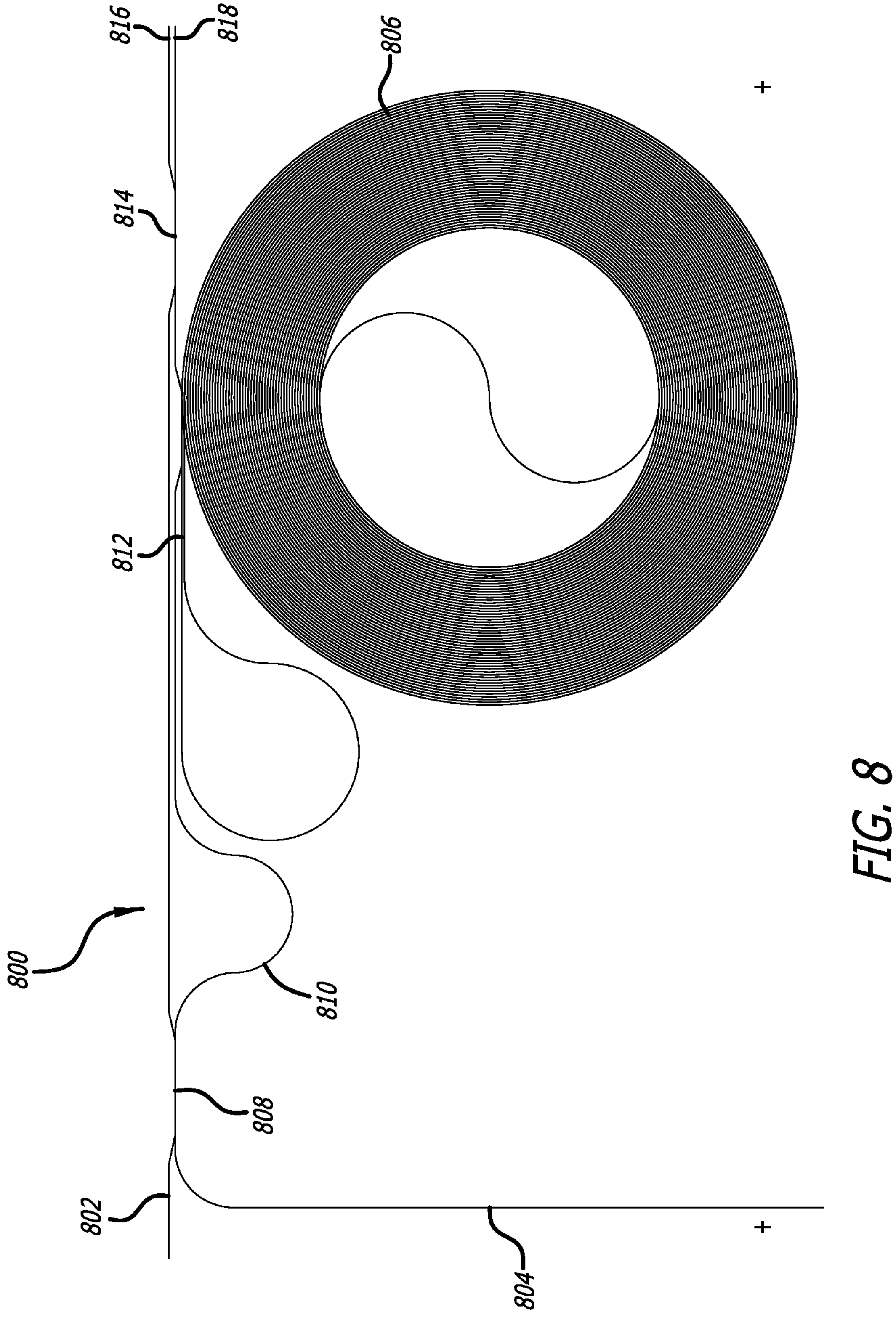
FIG. 8 conceptually illustrates an example self-delayed coil resonator suitable for use in OFD and laser stabilization.

An example self-delayed coil resonator suitable for use in OFD and laser stabilization is conceptually illustrated in FIG. 8. The self-delayed coil resonator 800 can include a first waveguide 802, a second waveguide 804, and a coil resonator 806. The first and second waveguides 802, 804 can be coupled by a coupler (e.g., a 50/50 splitter and recombiner) 808. After waveguided light passes the coupler 808, it can pass through a delay arm 810. The delay arm 810 can form part of the second waveguide 804. At a position downstream of the delay arm 810, the waveguided light in the second waveguide 804 can be coupled by a second coupler 812 into the coil resonator 806. At a position after the coupler 812 along the second waveguide 804, the first and second waveguides 802, 804 can be coupled by a third coupler 814. The first waveguide 802 can have a first port 816. The second waveguide 804 can have a second port 818. In many embodiments, a coupler can be a 50-50 coupler and/or recombiner. Couplers can, in some embodiments, include an MZI gap of around 20 μm and/or have a length of around 1.4 mm. A coupler for coupling into a coil resonator, can in accordance with embodiments of the invention, have a gap of around 2.5 μm, and/or have a length of around 1.0 mm. In many embodiments, a self-delayed resonator can be used in an optical frequency discriminator (OFD) and/or a modulation-free PDH lock. In accordance with embodiments of the invention, light can be received into a first port. The light received to the first port can be coupled from a first waveguide to a second waveguide. After first coupling, the light can also be coupled into a coil resonator. In accordance with many embodiments light can sequentially travel first through a first coupler, be coupled into a coil resonator, and third travel through a second couple.

In many embodiments, a first output port of the first waveguide and a second output port of the second waveguide can be connected to a photodetector such that an optical signal can be used for optical frequency discrimination, laser stabilization and/or laser linewidth narrowing.

While specific methods and/or systems for integrated self-delayed coil-resonator are described above, any of a variety of methods and/or systems can be utilized as a integrated self-delayed coil-resonator as appropriate to the requirements of specific applications. In certain embodiments, steps and/or components may be performed and/or configured in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to a integrated self-delayed coil-resonator, the techniques disclosed herein may be used in any type of integrated optical system. The techniques disclosed herein may be used within any of the integrated optical systems, laser stabilization systems, linewidth narrowing systems, optical frequency discriminator systems, and/or other components and/or systems as described herein.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A photonic integrated circuit forming part of a Mach Zehnder interferometer, the photonic integrated circuit comprising:

a first waveguide with an optical input at a first port and comprising a waveguide delay arm;

a second waveguide;

a first coupler that optically couples the first waveguide to the second waveguide at a first position;

a waveguide coil resonator; and a second coupler that optically couples the first waveguide to the second waveguide at a second position, the second position different from the first position.

2. The photonic integrated circuit of claim 1, wherein light received to the first port sequentially passes first through the first coupler, second through the waveguide delay arm, and third through the second coupler.

3. The photonic integrated circuit of claim 1, wherein the waveguide delay arm is 2 meters long.

4. The photonic integrated circuit of claim 1, wherein the waveguide delay arm is positioned between the first coupler and the second coupler along a beamline.

5. The photonic integrated circuit of claim 1, wherein a first output port of the first waveguide and a second output port of the second waveguide is connected to a photodetector such that an optical signal can be used for optical frequency discrimination.

6. The photonic integrated circuit of claim 1, wherein a first output port of the first waveguide and a second output port of the second waveguide is connected to a detector such that an optical signal can be used to generate a control input for a laser.

7. The photonic integrated circuit of claim 1, wherein the first coupler has a gap of 2 μm and a length of 1.4 mm.

8. The photonic integrated circuit of claim 1, wherein a first output port of the first waveguide and a second output port of the second waveguide are used for laser stabilization.

9. The photonic integrated circuit of claim 1, further comprising a laser, wherein a laser optical wavelength is selected from a list consisting of Deep UV, UV, near UV, Visible, Near IR, Mid IR and IR wavelengths.

10. The photonic integrated circuit of claim 1, wherein the photonic integrated circuit is formed of a material, the material selected from a list consisting of silicon nitride, tantalum pentoxide, aluminum nitride, and alumina oxide.

11. A photonic integrated circuit forming part of a Mach Zehnder interferometer, the photonic integrated circuit comprising:

a resonator, wherein the resonator is a coil resonator;

a first waveguide comprising an optical input at a first port and a delay arm;

a second waveguide, the second waveguide coupled to the resonator at a first position;

a first coupler that optically couples the first waveguide to the second waveguide at a second position; and a second coupler that optically couples the first waveguide to the second waveguide at a third position, wherein the waveguide delay arm is positioned between the first coupler and the second coupler.

12. The photonic integrated circuit of claim 11, wherein optical properties of the delay arm can be configured by a tuning effect, the tuning effect selected from a list consisting of electro-optic tuning effect, stress-optic tuning effect, current-injection tuning effect, and thermo-optic tuning effect.

13. The photonic integrated circuit of claim 11, further comprising an output port, wherein an output from the output port is connected to a photodetector such that an optical signal can be used for optical frequency discrimination.

14. The photonic integrated circuit of claim 11, further comprising an output port, wherein an output from the output port is connected to a detector such that an optical signal can be used to generate a control input for a feedback loop to lock a laser.

15. The photonic integrated circuit of claim 11, wherein the first coupler has a gap of 1 μm and a length of 1.4 mm.

16. The photonic integrated circuit of claim 11, wherein a first output port of the first waveguide and a second output port of the second waveguide are used for laser stabilization.

17. The photonic integrated circuit of claim 11, further comprising a laser, wherein a laser optical wavelength is selected from a list consisting of Deep UV, UV, near UV, Visible, Near IR, Mid IR and IR wavelengths.

18. The photonic integrated circuit of claim 11, wherein the photonic integrated circuit is formed of a material, the material selected from a list consisting of silicon nitride, tantalum pentoxide, aluminum nitride, and alumina oxide.

* * * * *